(12) United States Patent
Paulrajan et al.

(10) Patent No.: US 10,235,714 B2
(45) Date of Patent: Mar. 19, 2019

(54) CUSTOMIZED VIRTUAL REALITY USER ENVIRONMENT CONTROL

(71) Applicant: Verizon Patent and Licensing Inc., Arlington, VA (US)

(72) Inventors: Vijayanand K. Paulrajan, Bridgewater, NJ (US); Farook Kaleem, Edison, NJ (US); Amit Mahajan, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 593 days.

(21) Appl. No.: 14/556,879

(22) Filed: Dec. 1, 2014

(65) Prior Publication Data

US 2016/0155187 A1 Jun. 2, 2016

(51) Int. Cl.
| | |
|---|---|
| *G06Q 30/00* | (2012.01) |
| *G06Q 30/06* | (2012.01) |
| *G06F 3/01* | (2006.01) |
| *H04L 29/08* | (2006.01) |

(52) U.S. Cl.
CPC ......... *G06Q 30/0643* (2013.01); *G06F 3/011* (2013.01); *H04L 67/10* (2013.01); *H04L 67/306* (2013.01)

(58) Field of Classification Search
CPC ..... G06Q 30/0643; G06F 3/011; H04L 67/10; H04L 67/306
See application file for complete search history.

(56) References Cited

U.S. PATENT DOCUMENTS

| | | | | |
|---|---|---|---|---|
| 8,578,416 | B1 * | 11/2013 | Radloff | H04N 5/445 725/41 |
| 9,645,221 | B1 * | 5/2017 | Heizer | G06Q 30/0255 |
| 2004/0193441 | A1 * | 9/2004 | Altieri | G06Q 30/02 709/203 |

(Continued)

FOREIGN PATENT DOCUMENTS

| | | | | |
|---|---|---|---|---|
| WO | WO 01/69364 A2 | * | 9/2001 | G06F 3/00 |
| WO | WO 02/48967 A1 | * | 6/2002 | G06T 17/00 |

OTHER PUBLICATIONS

California PATH Program University of California at Berkeley, "A Survey of Existing Technologies, Applications, Products, and Services for Geofencing", Nov. 12, 2010 (Year: 2010).*

(Continued)

*Primary Examiner* — Naeem U Haq
*Assistant Examiner* — Norman Donald Sutch, Jr.

(57) ABSTRACT

A device may receive identification information associated with a user. The device may determine user information based on the identification information associated with the user. The device may select a particular virtual reality user environment for providing content. The virtual reality user environment may be associated with a virtual store. The virtual reality user environment may include an interactive component. The device may generate a customized virtual reality user environment based on the particular virtual reality user environment and the user information. The customized virtual reality user environment may include access to content selected based on the user information. The device may provide access to the customized virtual reality user environment for display.

20 Claims, 18 Drawing Sheets

(56) References Cited

U.S. PATENT DOCUMENTS

| | | | | |
|---|---|---|---|---|
| 2005/0261980 | A1* | 11/2005 | Hadi | G06Q 30/06 705/26.43 |
| 2008/0104018 | A1* | 5/2008 | Xia | G06F 9/4443 |
| 2009/0037291 | A1* | 2/2009 | Dawson | G06Q 30/02 705/27.2 |
| 2010/0050237 | A1* | 2/2010 | Bokor | G06Q 30/02 726/4 |
| 2010/0070378 | A1* | 3/2010 | Trotman | G06Q 30/02 705/26.1 |
| 2010/0185514 | A1* | 7/2010 | Glazer | G06Q 30/0253 705/14.51 |
| 2010/0205043 | A1* | 8/2010 | Edwards | G06Q 30/0201 705/7.29 |
| 2011/0119581 | A1* | 5/2011 | Bhogal | G06Q 10/10 715/704 |
| 2012/0242865 | A1* | 9/2012 | Vartanian | H04N 5/23206 348/239 |
| 2012/0327119 | A1* | 12/2012 | Woo | G06F 17/30029 345/633 |
| 2013/0117377 | A1* | 5/2013 | Miller | H04L 67/38 709/205 |
| 2013/0203026 | A1* | 8/2013 | Sundaresh | G09B 7/00 434/219 |
| 2013/0317950 | A1* | 11/2013 | Abraham | G06Q 30/06 705/27.1 |
| 2014/0280504 | A1* | 9/2014 | Cronin | H04L 67/38 709/203 |
| 2015/0058102 | A1* | 2/2015 | Christensen | G11B 27/11 705/14.6 |
| 2016/0035016 | A1* | 2/2016 | Spio | G06Q 50/01 705/27.2 |
| 2016/0093108 | A1* | 3/2016 | Mao | A63F 13/42 345/633 |

OTHER PUBLICATIONS

James Vincent; "Tesco Dreams Big With Fully Immersive Virtual Reality Store for the Oculus Rift"; Mar. 24, 2014; independent.co.uk (Year: 2014).*

Wikipedia, "Head-mounted display," http://en.wikipedia.org/wiki/Head-mounted_display, Aug. 23, 2014, 9 pages.

Wikipedia, "Oculus Rift," http://en.wikipedia.org/wiki/Oculus_Rift, Aug. 27, 2014, 11 pages.

* cited by examiner

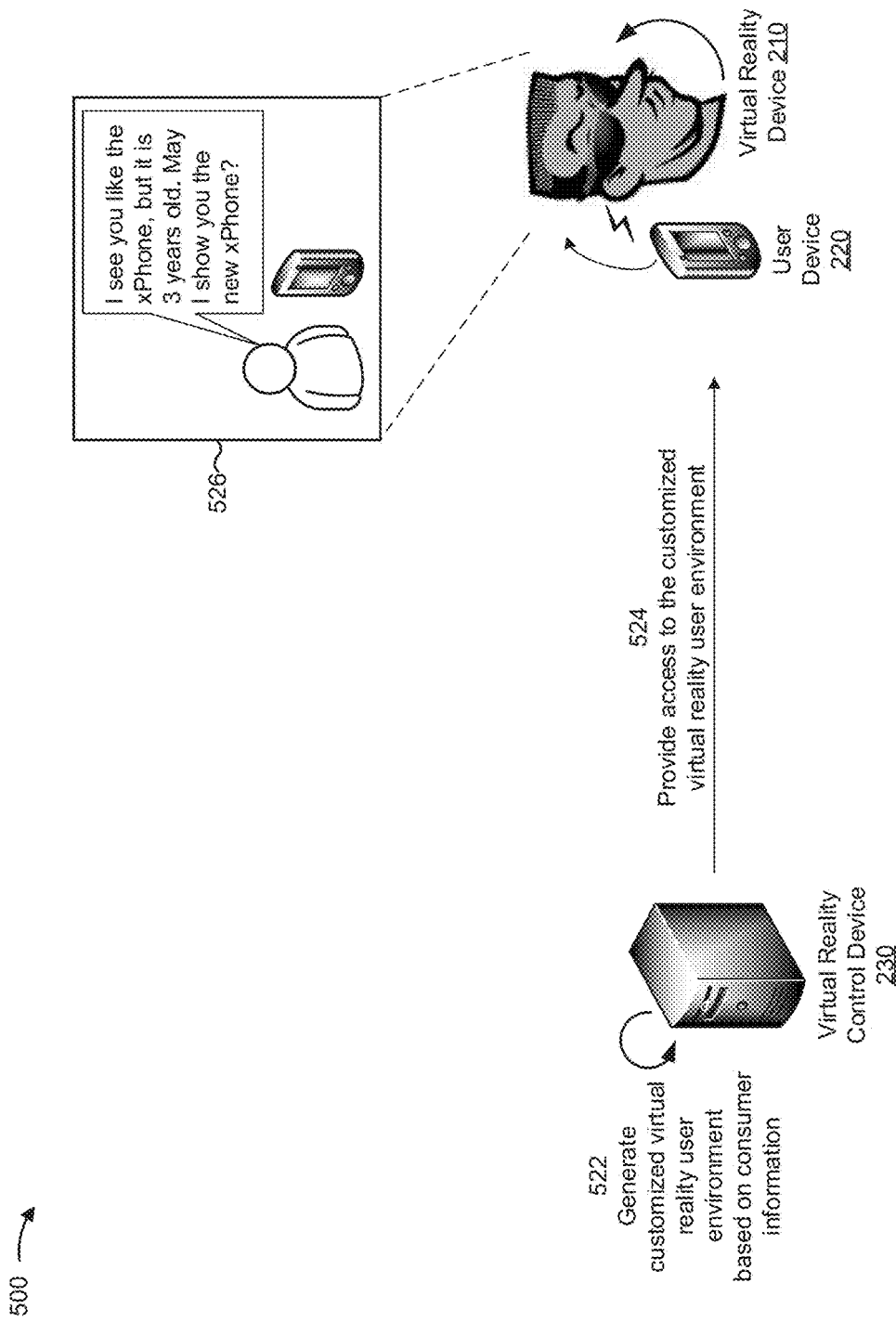

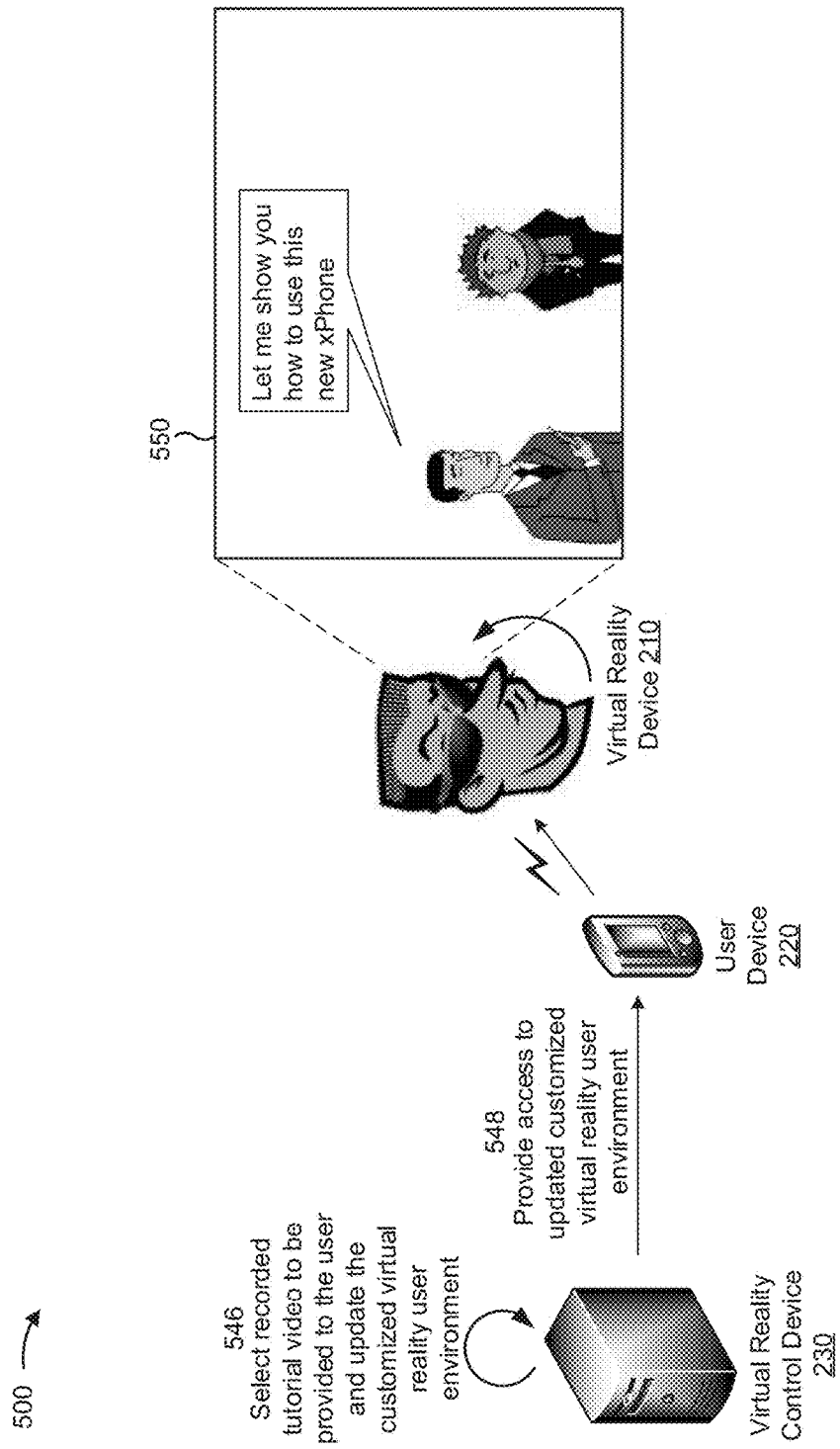

CUSTOMIZED VIRTUAL REALITY USER ENVIRONMENT CONTROL

BACKGROUND

A user may utilize a virtual reality device, such as a virtual reality headset, a head-mounted display, or the like, to view a particular environment. The particular environment, such as a house, a room, a park, or the like, may be generated as a computer-generated video.

BRIEF DESCRIPTION OF THE DRAWINGS

FIGS. 5A-5H are diagrams of an example implementation relating to the example process shown in FIG. 4;

DETAILED DESCRIPTION OF PREFERRED EMBODIMENTS

The following detailed description of example implementations refers to the accompanying drawings. The same reference numbers in different drawings may identify the same or similar elements.

A user may utilize a virtual reality device to view a computer-generated video of a location, such as a conference room, a store, or the like. A provider may select, and the virtual reality device may provide a set of predetermined interactions with the location. However, the set of predetermined interactions may lack targeting and relevancy to a particular user. Implementations, described herein, may assist a virtual reality control device in generating and updating a customized virtual reality user environment using user information to intelligently customize a user experience therein. In this way, an operator of the virtual reality control device may provide interactive virtual customer service, shopping, training, or the like to a user without requiring that the user be physically present in a store. Implementations, described herein, also permit a user to share a virtual reality experience, or other content, with another user.

Figure 1A:
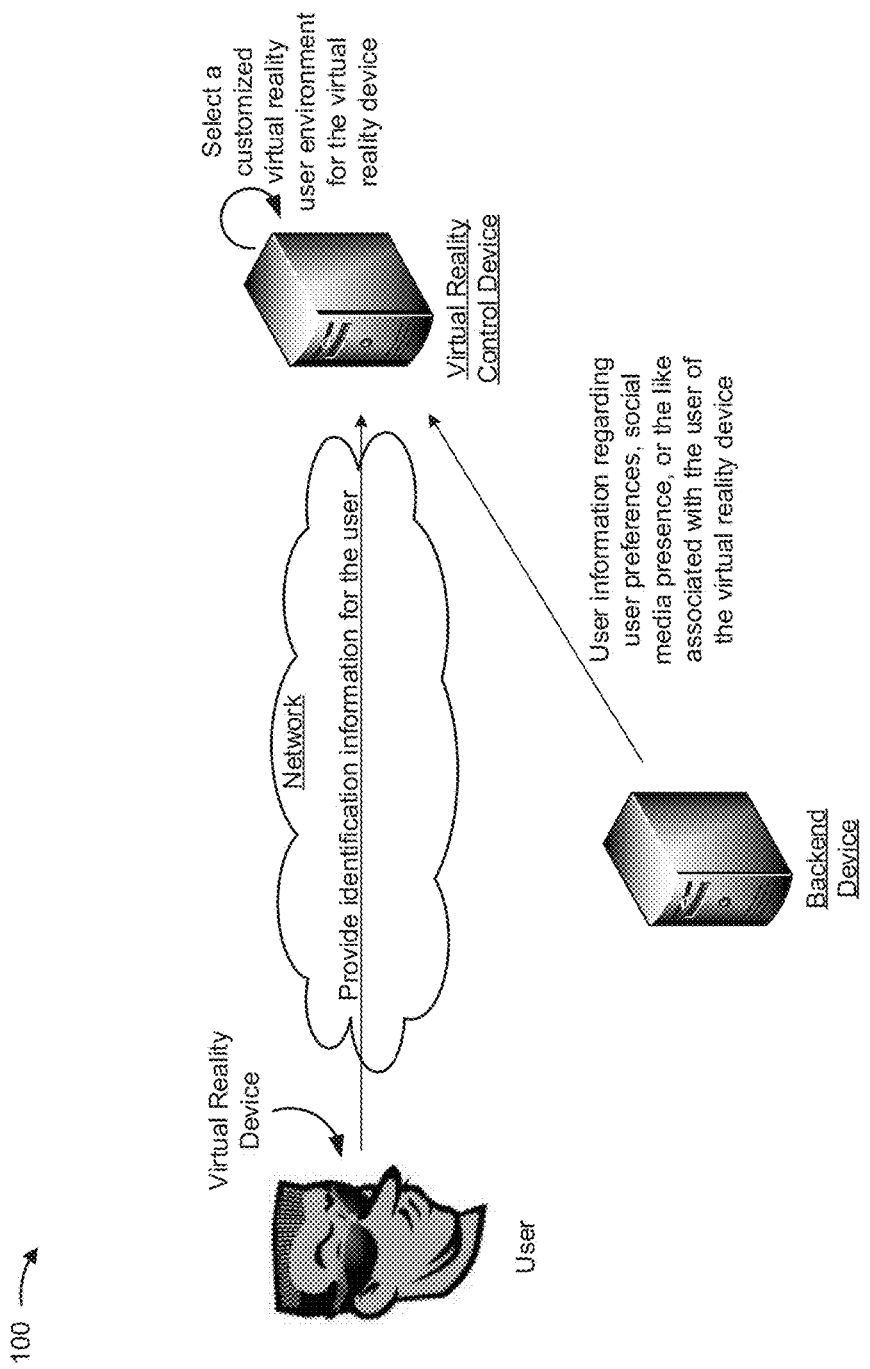
FIGS. 1A and 1B are diagrams of an overview of an example implementation described herein.
Figure 1B:
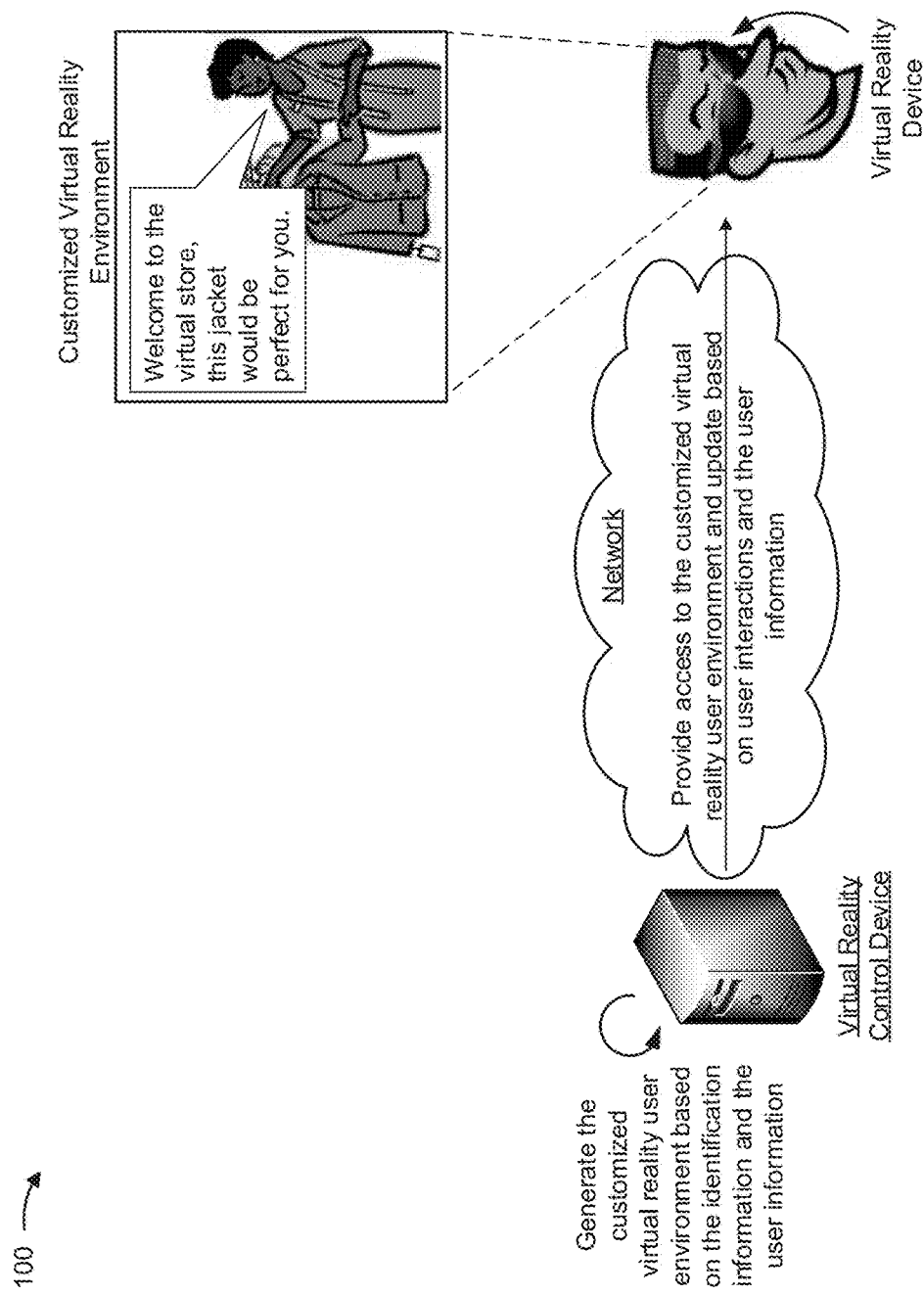

FIGS. 1A and 1B are diagrams of an overview of an example implementation 100 described herein. As shown in FIG. 1A, assume that a user is utilizing a virtual reality device connected via a network to a virtual reality control device. The virtual reality device may provide, to the virtual reality control device and via the network, identification information for the user. The virtual reality control device may receive the identification information for the user (e.g., information identifying the user), and may determine user information associated with the user. For example, the virtual reality control device may provide the identification information to a backend device, and may receive particular user information regarding the user. The user information may include information regarding a set of user preferences, a set of past purchases, a social media presence, a location, or the like. Additionally, or alternatively, the virtual reality control device may query the user to determine the user information. The virtual reality control device may select a customized virtual reality user environment for the virtual reality device, such as a store, a classroom, or the like, based on, for example the set of user preferences, the location, or the like. Additionally, or alternatively, the virtual reality control device may receive information from the user, via the virtual reality device, a user device, or the like, indicating a particular customized virtual reality user environment that is to be selected.

As shown in FIG. 1B, the virtual reality control device may generate the customized virtual reality user environment based on the identification information and the user information. For example, the virtual reality control device may determine, based on the user information, that the user is a previous customer of a particular vendor and may generate a particular customized virtual reality user environment associated with the particular vendor for providing information relating to a product upgrade, a product repair, a product tutorial, or the like, associated with a device previously purchased by the user. Additionally, or alternatively, the virtual reality control device may determine that the user is not a previous customer and may generate an at least partially different particular customized virtual reality user environment for providing information relating to a product sale, a sign up service, or the like. The virtual reality control device may provide, to the virtual reality device (e.g., via the network), access to the customized virtual reality user environment. The user may interact with the customized virtual reality user environment, and the virtual reality control device may update the customized virtual reality user environment based on one or more user interactions and the user information. For example, the virtual reality control device may offer a discount to a particular user viewing a particular product based on user information indicating a threshold level of user loyalty for the particular user (e.g., the particular user has purchased a threshold quantity of products from the vendor, or the like). By providing a customized virtual reality user environment via a virtual reality device, a store operator may provide in-store experiences to users unable to visit a brick-and-mortar store (e.g., a physical store) due to illness, disability, lack of transportation, inconvenient location, laziness, or the like.

Figure 2:
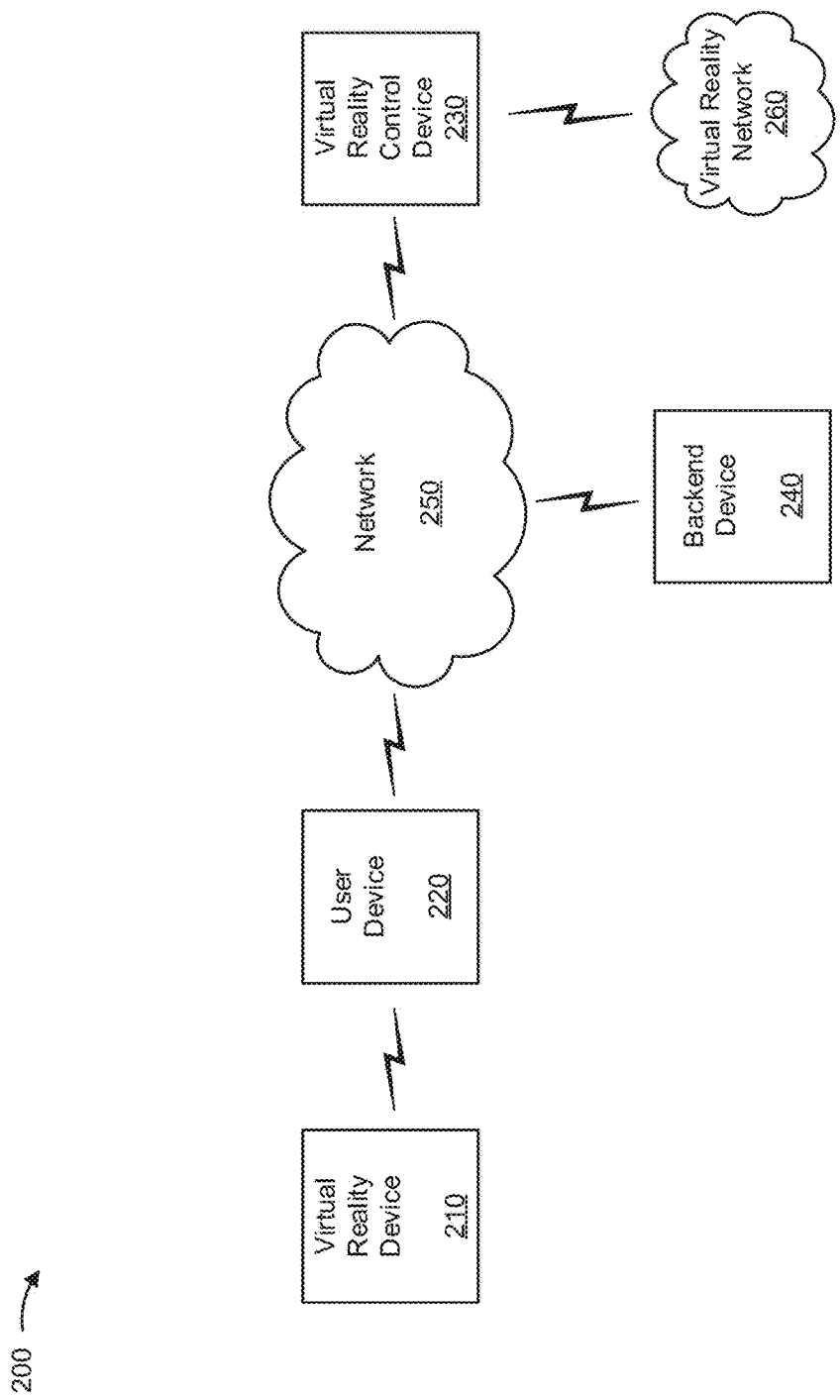
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a virtual reality device 210, a user device 220, a virtual reality control device 230, a backend device 240, a network 250, and a virtual reality network 260. Devices of environment 200 may interconnect via wired connections, wireless connections, or a combination of wired and wireless connections.

Virtual reality device 210 may include a device capable of receiving, generating, storing, processing, and/or providing a virtual reality user environment. For example, virtual reality device 210 may include a head-mounted display, an optical head-mounted display, a helmet-mounted display, an augmented reality display, an Oculus Rift®, or the like. In some implementations, virtual reality device 210 may connect to network 250 (e.g., directly via a communication interface integrated into virtual reality device 210, or indirectly via a Bluetooth connection, a near field communication (NFC) connection, a wireless local area network (WLAN) connection, or the like with user device 220). In some implementations, virtual reality device 210 may facilitate interaction with a customized virtual reality user environment, such as via one or more input peripherals. In some implementations, virtual reality device 210 may be associated with a set of capabilities, device attributes, or the like, such as an augmented reality overlay capability, a heads-up display eye tracking capability, or the like.

User device 220 may include a device capable of receiving, generating, storing, processing, and/or providing information associated with a virtual reality user environment. For example, user device 220 may include a communications and/or computing device, such as a mobile phone (e.g., a smart phone, a radiotelephone, etc.), a laptop computer, a tablet computer, a handheld computer, a desktop computer, a gaming device, a router, an access point, or a similar device. In some implementations, user device 220 may receive information from and/or transmit information to another device in environment 200. In some implementations, user device 220 may access stored user information regarding a user of user device 220, and may provide the stored user information to virtual reality control device 230.

Virtual reality control device 230 may include one or more devices capable of storing, processing, and/or routing information associated with a virtual reality user environment. For example, virtual reality control device 230 may include a server associated with a particular operator, such as a store, a vendor, a repair technician, an instructional video provider, a network service provider, or another operator that may provide a virtual reality environment, and virtual reality control device 230 may provide a customized virtual reality user environment associated with the particular operator. In some implementations, virtual reality control device 230 may include access to one or more data structures storing information regarding a user of virtual reality device 210, user device 220, or the like (e.g., via backend device 240). In some implementations, virtual reality control device 230 may include a communication interface that allows virtual reality control device 230 to receive information from and/or transmit information to other devices in environment 200.

Backend device 240 may include one or more devices capable of storing, processing, and/or routing information associated with user information, such as user subscription information, user billing information, or the like. For example, backend device 240 may include a server with access to one or more user information data structures, such as a billing information data structure that stores billing information for a group of users, a purchase information data structure that stores information regarding purchases made by a group of users, a preference information data structure that stores preference information associated with a group of users, or another public or private data structure.

Network 250 may include one or more wired and/or wireless networks. For example, network 250 may include a cellular network (e.g., a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

Virtual reality network 260 may include one or more wired and/or wireless networks and/or one or more devices associated with the one or more wired and/or wireless networks. For example, virtual reality network 260 may include a cloud computing network, a cloud server, a cloud data structure, or the like. In some implementations, virtual reality network 260 may include information associated with providing a virtual reality user environment to a user via virtual reality device 210. In some implementations, virtual reality control device 230 may retrieve information associated with a particular virtual reality user environment from virtual reality network 260, and may provide the information to virtual reality device 210 (e.g., via network 250).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although virtual reality device 210 and user device 220 are shown as two separate devices, virtual reality device 210 and user device 220 may be implemented within a single device. Additionally, or alternatively, a set of devices (e.g., one or more devices) of environment 200 may perform one or more functions described as being performed by another set of devices of environment 200.

Figure 3:
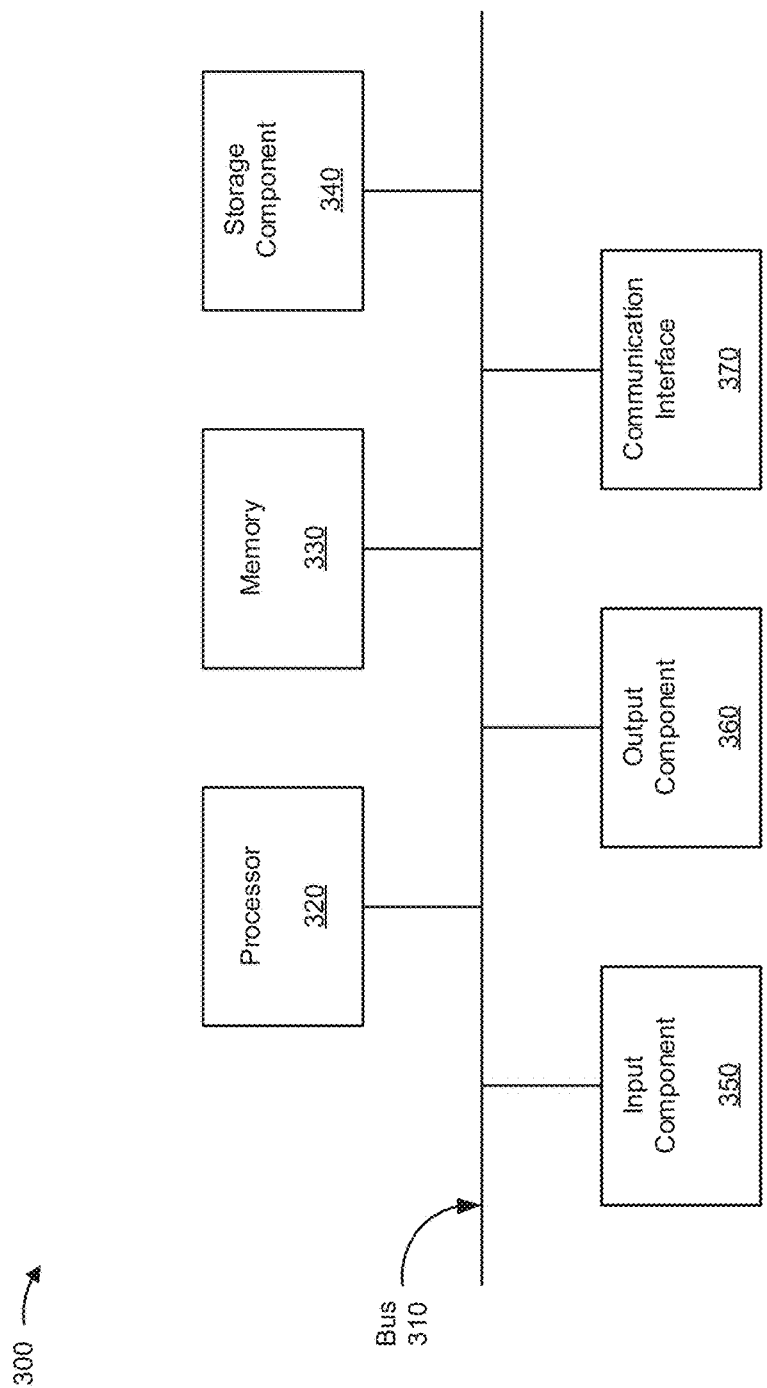
FIG. 3 is a diagram of example components of one or more devices of FIG. 2.

FIG. 3 is a diagram of example components of a device 300. Device 300 may correspond to virtual reality device 210, user device 220, virtual reality control device 230, and/or backend device 240. In some implementations, virtual reality device 210, user device 220, virtual reality control device 230, and/or backend device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
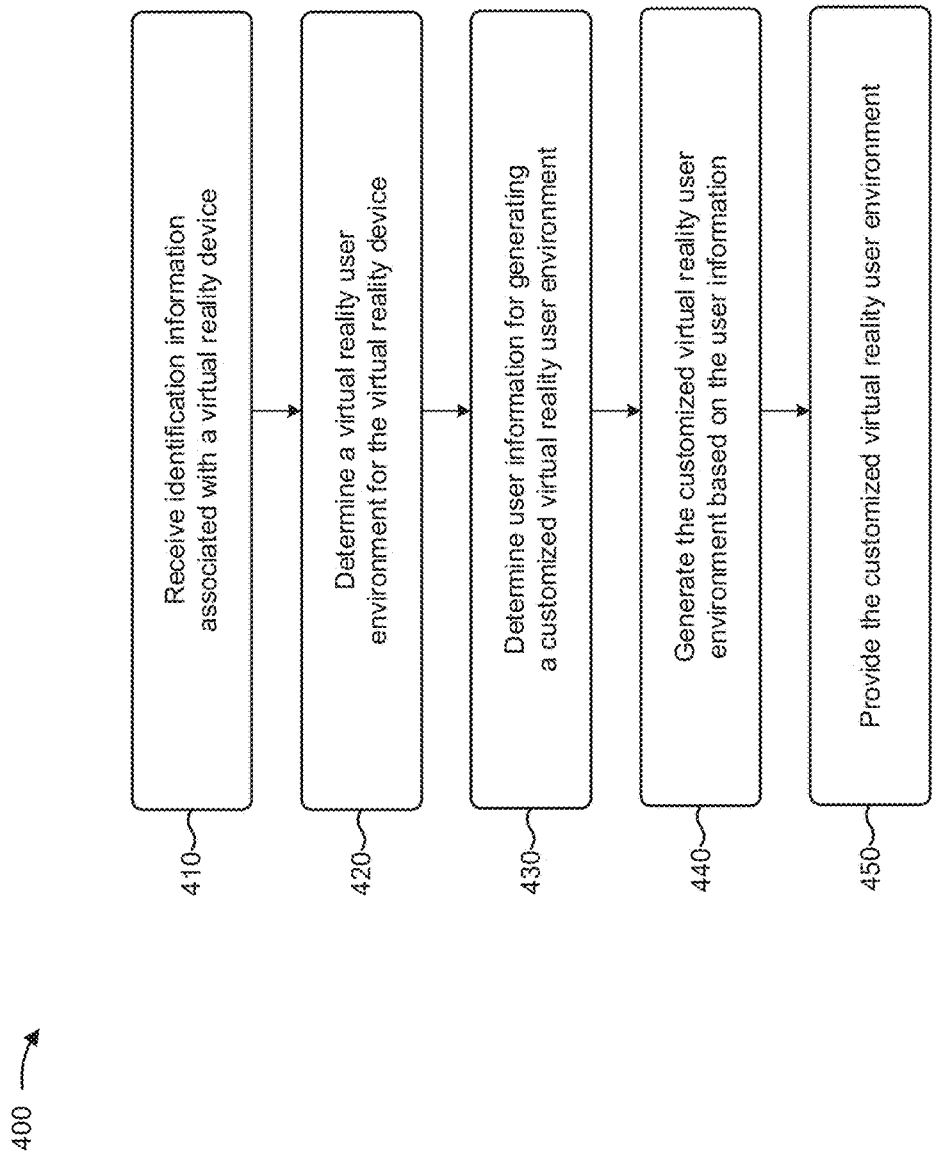
FIG. 4 is a flow chart of an example process for providing a customized virtual reality user environment.

FIG. 4 is a flow chart of an example process 400 for providing a customized virtual reality user environment. In some implementations, one or more process blocks of FIG. 4 may be performed by virtual reality control device 230. Additionally, or alternatively, one or more process blocks of FIG. 4 may be performed by another device or a group of devices separate from or including virtual reality control device 230, such as virtual reality device 210, user device 220, and/or backend device 240.

As shown in FIG. 4, process 400 may include receiving identification information associated with a virtual reality device (block 410). For example, virtual reality control device 230 may receive, from virtual reality device 210 (e.g., directly or via user device 220), identification information associated with a user of virtual reality device 210. In some implementations, virtual reality control device 230 may receive the identification information when receiving a request to establish a customized virtual reality user environment. For example, virtual reality device 210 may request that virtual reality control device 230 establish the customized virtual reality user environment for a particular user. In some implementations, virtual reality control device 230 may receive the identification information via a request from another device for virtual reality device 210 (e.g., a request transmitted via network 250). For example, a particular user may purchase access to a particular customized virtual reality user environment (e.g., that is associated with viewing a live concert), and a server device processing the purchase may provide the identification information to virtual reality control device 230.

In some implementations, virtual reality control device 230 may authenticate virtual reality device 210 and/or the user of virtual reality device 210, after receiving the identification information from virtual reality device 210. For example, virtual reality control device 230 may assign an internet protocol (IP) address to virtual reality device 210 associated with facilitating one or more communications between virtual reality control device 230 and virtual reality device 210. Additionally, or alternatively, virtual reality control device 230 may verify one or more configuration settings associated with virtual reality device 210. For example, virtual reality control device 230 may determine that virtual reality device 210 is paired with user device 220 to provide communications, and may provide an indication to other users and/or devices that virtual reality device 210 is available for communications (e.g., other users and/or devices that are selected based on a digital contact book associated with user device 220, virtual reality device 210, etc., based on a user indication, or the like). Additionally, or alternatively, virtual reality control device 230 may determine whether a video associated with a customized virtual reality user environment is queued for transfer to virtual reality device 210 (e.g., based on the user having selected the video to be queued for transfer, the user information indicating that the video is to be queued for transfer, or the like). In this case, virtual reality control device 230 may determine that the video is to be provided when generating the customized virtual reality user environment (as described herein in connection with block 440).

In some implementations, virtual reality control device 230 may receive the identification information based on a previous communication with virtual reality device 210. For example, when a particular user has created a wish-list for a particular product and virtual reality control device 230 has determined the particular product to be available, virtual reality control device 230 may ping virtual reality device 210 to indicate that the particular product is available. In this case, virtual reality device 210 may provide the identification information based on receiving the ping. In some implementations, virtual reality control device 230 may ping virtual reality device 210 based on information identifying whether the user intends to receive a ping. For example, if the user is utilizing virtual reality device 210 to view a concert, virtual reality control device 230 may avoid pinging virtual reality device 210.

Virtual reality control device 230 may identify the user based on the identification information, in some implementations. For example, virtual reality control device 230 may receive identification information including a user name, a user identifier (e.g., a user account identifier, a social security number, etc.), a user record locator, or the like. Additionally, or alternatively, virtual reality control device 230 may identify virtual reality device 210 based on the identification information. For example, virtual reality control device 230 may receive identification information, including a media access control (MAC) address, an IP address, a mobile directory number (MDN), or the like, that is associated with virtual reality device 210.

In some implementations, virtual reality control device 230 may receive a request from a first virtual reality device 210 that the customized virtual reality user environment be shared with a second virtual reality device 210 being utilized by a second user. For example, when first virtual reality device 210 utilizes a first customized virtual reality user environment for a shopping experience and records the shopping experience, first virtual reality device 210 may request that the customized virtual reality user environment be shared with second virtual reality device 210 in order that a second user may view the shopping experience. In this case, virtual reality control device 230 may request authentication information from second virtual reality device 210 prior to sharing the customized virtual reality user environment. Additionally, or alternatively, virtual reality control device 230 may receive a request to share the customized virtual reality user environment with multiple virtual reality devices 210, such as for a virtual reality conference call, a virtual reality concert viewing experience, or the like.

As further shown in FIG. 4, process 400 may include determining a virtual reality user environment for the virtual reality device (block 420). For example, virtual reality control device 230 may determine the virtual reality user environment to provide to a user via virtual reality device 210. A virtual reality user environment may refer to an interactive, immersive, video that may be viewed by a particular user of virtual reality device 210. A customized virtual reality user environment may refer to an intelligently updated virtual reality user environment customized and selectively updated based on determined user information. The video may include a user interface depicting a computer-generated rendering of a location, a pre-recorded view of a location, a live-view of a location, a combination of a computer-generated rendering, pre-recorded view, and/or live view of a location, or the like. Additionally, or alternatively, the video may include an augmented-reality component. In some implementations, virtual reality control device 230 may provide a particular customized virtual reality user environment to multiple users via multiple virtual reality devices 210.

Virtual reality control device 230 may determine the virtual reality user environment based on one or more capabilities (e.g., attributes of virtual reality device 210 associated with a display, a network connection, a user interaction peripheral, etc.) in some implementations. For example, virtual reality control device 230 may select a video quality parameter of the virtual reality user environment based on a connection capability of virtual reality device 210. Additionally, or alternatively, virtual reality control device 230 may select a particular virtual reality user environment utilizing geo-fences based on determining that virtual reality device 210 includes a location determination capability. In this case, virtual reality control device 230 may select a particular environment (e.g., a particular virtual reality user environment) from the environments that virtual reality device 210 is capable of providing to the user. Additionally, or alternatively, virtual reality control device 230 may determine that virtual reality device 210 is associated with another device providing a location determination capability.

Additionally, or alternatively, virtual reality control device 230 may determine that virtual reality device 210 is capable of providing (i.e., includes a set of capabilities required for providing to a user) a store environment (e.g., a virtual reality user environment associated with a virtual store) that facilitates shopping, product tutorials, or the like, a mapping environment that facilitates route guidance to a particular location, such as a store, etc., a training environment that facilitates a training simulation for a store employee, a media sharing environment that facilitates sharing a photograph, a video, a shopping experience, etc., or the like.

Additionally, or alternatively, virtual reality control device 230 may query the user to select the particular environment. In this way, virtual reality control device 230 may select a customized virtual reality user environment based on determining a set of virtual reality user environments that virtual reality device 210 is configured to provide to a user, thereby providing compatibility with multiple differently configured virtual reality devices 210.

Virtual reality control device 230 may determine the customized virtual reality user environment based on a user selection, in some implementations. For example, virtual reality control device 230 may receive an indication, via virtual reality device 210, of a particular virtual reality user environment. Additionally, or alternatively, virtual reality control device 230 may select the virtual reality user environment based on processing user information (e.g., information regarding a user preference, a user billing account, a user identity, etc.), based on a set of previous user interactions, or the like.

Virtual reality control device 230 may determine the customized virtual reality user environment based on information associated with a provider. For example, when selecting a particular virtual reality user environment associated with a store, virtual reality control device 230 may access information regarding one or more available products, one or more available product tutorials, map data associated with a location for the store, one or more recordings produced by another user, or the like. In some implementations, virtual reality control device 230 may determine the virtual reality user environment based on a user selected location. For example, virtual reality control device 230 may determine, based on user preference information, location information, or the like, that a particular user is located within a threshold distance from a store of a chain of brick-and-mortar stores. In this case, virtual reality control device 230 may provide a user selection as to whether to generate a customized virtual reality user environment based on a particular nearby store or based on another store location (e.g., a store located near the user's home, a flagship store, etc.). Additionally, or alternatively, virtual reality control device 230 may determine the user's location, and may determine that the user has indicated a desire for a particular product available from a particular brick-and-mortar store (e.g., the user has identified the product on a wish-list). In this case, virtual reality control device 230 may select the particular brick-and-mortar store to be rendered via the customized virtual reality user environment based on the user's location, and based on determining that the particular product is available for purchase, without a user selection. In this way, virtual reality control device 230 may provide a user experience that simulates what the user may experience in a particular brick-and-mortar store.

As further shown in FIG. 4, process 400 may include determining user information for generating a customized virtual reality user environment (block 430). For example, virtual reality control device 230 may determine user information for generating the customized virtual reality user environment. User information may refer to information regarding a user accessing the customized virtual reality user environment (e.g., the user of virtual reality device 210). For example, user information may include information regarding a subscription plan for user device 220, information regarding a previously determined problem with virtual reality device 210, user device 220, or another device, information regarding a user's income, age, gender, or the like, information regarding the user's purchases, hobbies, interests, or the like, and/or another type of information regarding the user or a device associated with the user.

Virtual reality control device 230 may determine the user information based on one or more proprietary data structures. For example, virtual reality control device 230 may provide, to backend device 240, identification information associated with a user of virtual reality device 210, and may receive user information regarding the user. Additionally, or alternatively, virtual reality control device 230 may determine the user information based on one or more public data structures. For example, virtual reality control device 230 may access a public data structure (e.g., one or more data structures storing court records, criminal records, public records, etc.), a search engine, a social media website, or the like to determine user information. Additionally, or alternatively, virtual reality control device 230 may query a user to determine user information regarding the user. For example, virtual reality control device 230 may provide a set of questions, via virtual reality device 210, to determine information regarding a set of user preferences, a set of past purchases, or the like. In some implementations, virtual reality control device 230 may store user information gathered regarding the user (e.g., via a data structure associated with backend device 240).

As further shown in FIG. 4, process 400 may include generating the customized virtual reality user environment based on the user information (block 440). For example, virtual reality control device 230 may generate the customized virtual reality user environment based on processing user information regarding a user associated with virtual reality device 210 to selectively modify a selected virtual reality user environment.

In some implementations, virtual reality control device 230 may generate a rendering of a particular location with a particular set of content customized based on the user information. For example, when generating a particular customized virtual reality user environment associated with a store, virtual reality control device 230 may provide an option for viewing virtual reality directions to the store, viewing virtual reality directions within a store or another location, viewing products available at the store (e.g., that may be presented based on processing the user information to determine that a first product is more likely to be of interest to the user than a second product), viewing a travel path to the store, viewing a set of training tutorials of a product already owned by the user (e.g., that may be determined based on user information regarding a set of prior purchases, user information indicating whether a particular prior purchase of the set of prior purchases is still be utilized by the user, or the like), viewing a customized offer (e.g., that may be determined based on processing user information to determine user suitability for the customized offer), or the like. In this case, virtual reality control device 230 may identify a set of products that the user has indicated are of interest, and may include information that is associated with the set of products when generating the customized virtual reality user environment.

In some implementations, virtual reality control device 230 may include information associated with a location of a user of virtual reality device 210 when generating the customized virtual reality user environment. For example, when identification information provided to virtual reality control device 230 includes location information for virtual reality device 210, virtual reality control device 230 may provide information regarding one or more points of interest (e.g., a store, a particular sales offer from the store, etc.) around a particular location (e.g., a location for virtual reality device 210, a location of a brick-and-mortar store associated with the customized virtual reality user environment, a set of locations along a route between the location of virtual reality device 210 and the location of the brick-and-mortar store, etc.).

In some implementations, virtual reality control device 230 may generate a first rendering of a particular location for a first user associated with a first service tier and a second rendering of the particular location for a second user associated with a second service tier. For example, when the first user purchases a virtual reality user environment associated with viewing a concert, the first user may pay a particular amount associated with the first service tier, and may cause virtual reality control device 230 to generate a first virtual reality user environment associated with a particular seat. In this case, the second user, who mays another amount associated with the second service tier may cause virtual reality control device 230 to generate a second virtual reality user environment associated with another seat.

As further shown in FIG. 4, process 400 may include providing the customized virtual reality user environment (block 450). For example, virtual reality control device 230 may provide access to the customized virtual reality user environment via virtual reality device 210. In some implementations, virtual reality control device 230 may provide the customized virtual reality user environment via a streaming connection, a download connection, or the like. For example, virtual reality control device 230 may establish a connection via which information associated with the customized virtual reality user environment may be accessed while the customized virtual reality user environment is in use. Additionally, or alternatively, virtual reality control device 230 may establish the connection to provide the information associated with the customized virtual reality user environment to virtual reality device 210 for download and storage, and virtual reality device 210 may later provide the customized virtual reality user environment to a user.

In some implementations, virtual reality control device 230 may provide the customized virtual reality user environment on a time delay. For example, when virtual reality control device 230 generates a customized virtual reality user environment associated with an event (e.g., a concert, a sports event, etc.), virtual reality control device 230 may delay providing the customized virtual reality user environment until virtual reality control device 230 receives a notification trigger (e.g., that indicates that the event has started, that indicates that the user is ready to receive the event via the customized virtual reality user environment, or the like). Additionally, or alternatively, when a user selects a product to be placed on a wish-list, virtual reality control device 230 may delay providing the customized virtual reality user environment for content regarding the product until the product becomes available for purchase at a brick-and-mortar store within a threshold distance of the user's location (e.g., that may be determined based on information provided by virtual reality device 210, based on a user-established geo-fence, etc.). For example, a user may configure a geo-fence for a particular location (e.g., around the user's house, around a route that the user intends to use, etc.), and may associate the geo-fence with a wish-list of products to be purchased. In this case, virtual reality control device 230 may provide an indication of the wish-list of products to one or more physical stores located within the geo-fence, and, upon receiving a notification, from a particular physical store of the one or more physical stores, that a particular product of the wish-list of products is available, may provide a customized virtual reality user environment for purchasing the particular product, for directions to the particular physical store, or the like.

In some implementations, virtual reality control device 230 may provide connectivity between virtual reality device 210 and another virtual reality device 210, a display device, or the like, when providing the customized virtual reality user environment. For example, when virtual reality control device 230 generates a particular customized virtual reality user environment that provides a conference calling feature, virtual reality control device 230 may establish a connection between virtual reality device 210 and another party to the conference call (e.g., by providing an avatar of the other party, a video of the other party, or the like for display via virtual reality device 210). Additionally, or alternatively, virtual reality control device 230 may provide the customized virtual reality user environment to multiple virtual reality devices 210. In this case, virtual reality control device 230 may update the customized virtual reality user environment to include content based on user information associated with multiple users (e.g., utilizing multiple virtual reality devices 210). In this way, virtual reality control device 230 may permit sharing of a single customized virtual reality user environment.

In some implementations, virtual reality control device 230 may intelligently update the customized virtual reality user environment based on a user interaction, when providing the customized virtual reality user environment. For example, a user may interact with a particular object being provided via the customized virtual reality user environment (e.g., the user may open a virtual book, put a product in a virtual shopping cart, look at a virtual photo, lift a virtual object, purchase a product or service, etc.), and virtual reality control device 230 may provide particular content based on the user interaction. In this case, virtual reality control device 230 may provide the particular content via the customized virtual reality user environment. Additionally, or alternatively, virtual reality control device 230 may provide the particular content via another customized virtual reality user environment that replaces the customized virtual reality user environment and is generated in a similar manner.

In some implementations, virtual reality control device 230 may suggest content to the user based on the user interaction. For example, when a user interacts with a product, virtual reality control device 230 may provide, via the customized virtual reality user environment, access to training tutorial content, driving directions content (e.g., to a store from which the product may be purchased), or the like (e.g., content that may be selected based on user information, based on the particular user interaction with the product, or the like). Additionally, or alternatively, virtual reality control device 230 may determine (e.g., based on the user information) that the user qualifies for a special offer associated with the product, and may provide information identifying the offer via the customized virtual reality user environment. In some implementations, virtual reality device 230 may process a transaction for the user based on the user interaction. For example, when a particular user interacts with a particular product, virtual reality device 230 may determine that the user intends to purchase the product, and may access user information associated with a payment method to permit the user to purchase the product. In this way, the user experience may approximate that of a store with a live-person providing product information and sales offers.

In some implementations, virtual reality control device 230 may store information associated with providing the customized virtual reality user environment, such as user interaction information, a recording, or the like. For example, when a user interacts within the customized virtual reality user environment, virtual reality control device 230 may record the user interaction. In this case, virtual reality control device 230 may permit the user to subsequently view the recording, share the recording (e.g., with a friend, family member, etc.), or the like. In some implementations, virtual reality control device 230 may permit another user, to whom the recording is shared, to annotate the recording, and may provide one or more annotations to the user that shared the recording. Additionally, or alternatively, virtual reality control device 230 may facilitate sharing of other information via a virtual reality user environment, such as an image, a video, an audio recording, or the like. For example, virtual reality device 230 may receive an indication from a first user via a first virtual reality device 210 that a particular video is to be shared with a second user via a second virtual reality device 210. In this case, virtual reality control device 230 may provide a request that the particular video be shared with second virtual reality device 210 (e.g., shared live, shared on a time-delay, etc.), and may provide the video based on IP address information, MAC address information, or the like for second virtual reality device 210. In some implementations, virtual reality control device 230 may request that storage be reserved for sharing videos. For example, virtual reality control device 230 may request that a cloud storage device allocate a particular quantity of storage space for virtual reality control device 230 to store videos to be shared with other users (e.g., friends, family, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of an example implementation 500 relating to example process 400 shown in FIG. 4. FIGS. 5A-5H show an example of providing a customized virtual reality user environment.

Figure 5A:
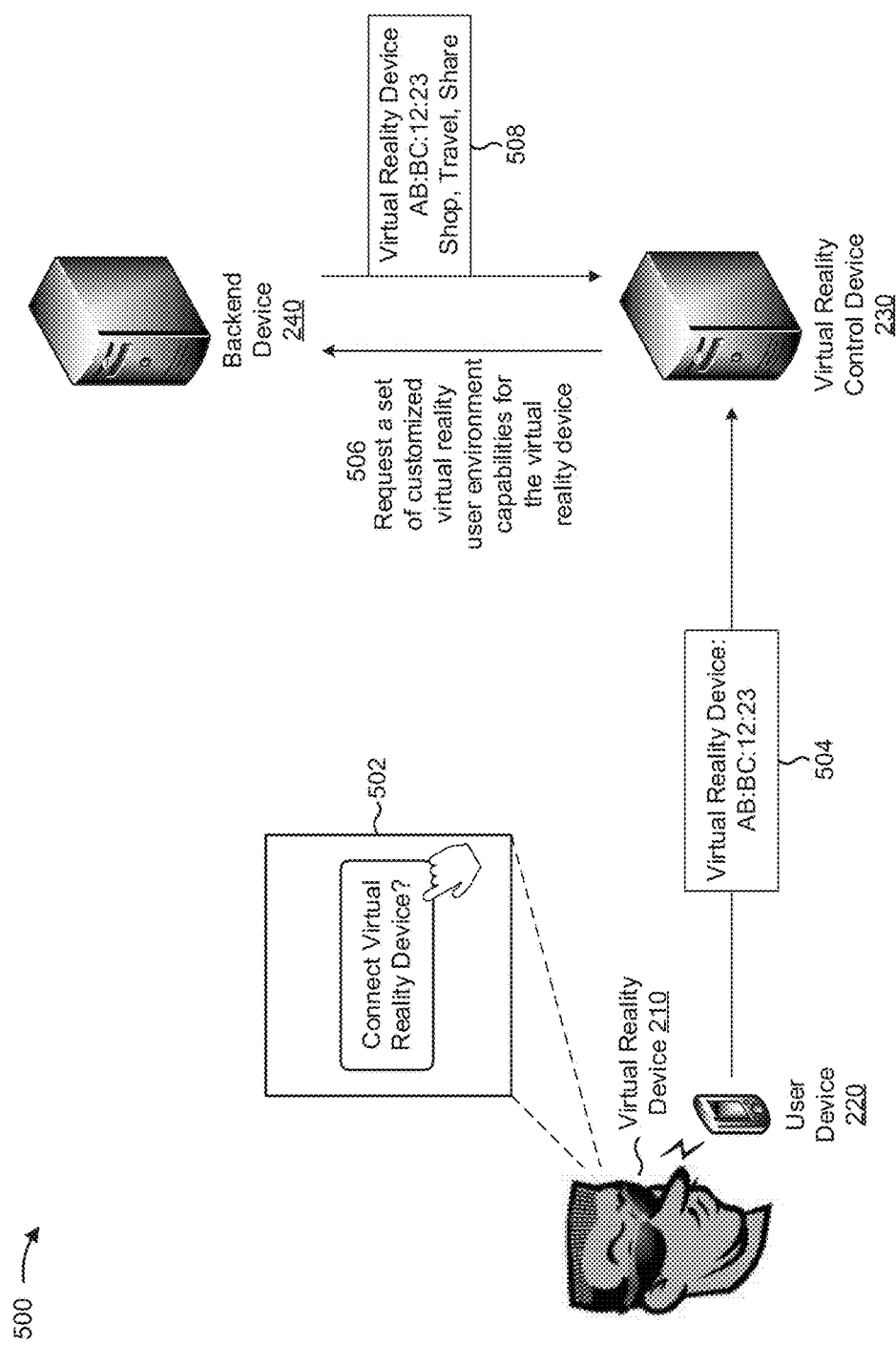

As shown in FIG. 5A, and by reference number 502, virtual reality device 210 may provide a user interface for a user. Assume that virtual reality device 210 connects to virtual reality control device 230 via user device 220. The user may interact with the user interface (e.g., via an input associated with virtual reality device 210). As shown by reference number 504, based on user interaction with the user interface, user device 220 provides identification information for virtual reality device 210 (e.g., a device identifier, "AB:BC:12:23"). Virtual reality control device 230 receives the identification information and, as shown by reference number 506, requests user information associated with the user. As shown by reference number 508, virtual reality control device 230 receives a message from backend device 240 indicating a particular set of customized virtual reality user environment options for virtual reality device 210 (e.g., "Shop," "Travel," and "Share"). The particular set of customized virtual reality user environment options may be selected based on one or more capabilities associated with virtual reality device 210. For example, backend device 240 may indicate that a driving directions option is to be permitted based on determining that virtual reality device 210 includes, or has access to, a GPS navigation capability. In this way, virtual reality control device 230 may interact with virtual reality devices 210 having different capabilities (e.g., different display capabilities, such as a particular display resolution, a particular display zoom capability, or the like, different user interaction capabilities, different network connection capabilities, etc.).

Figure 5B:
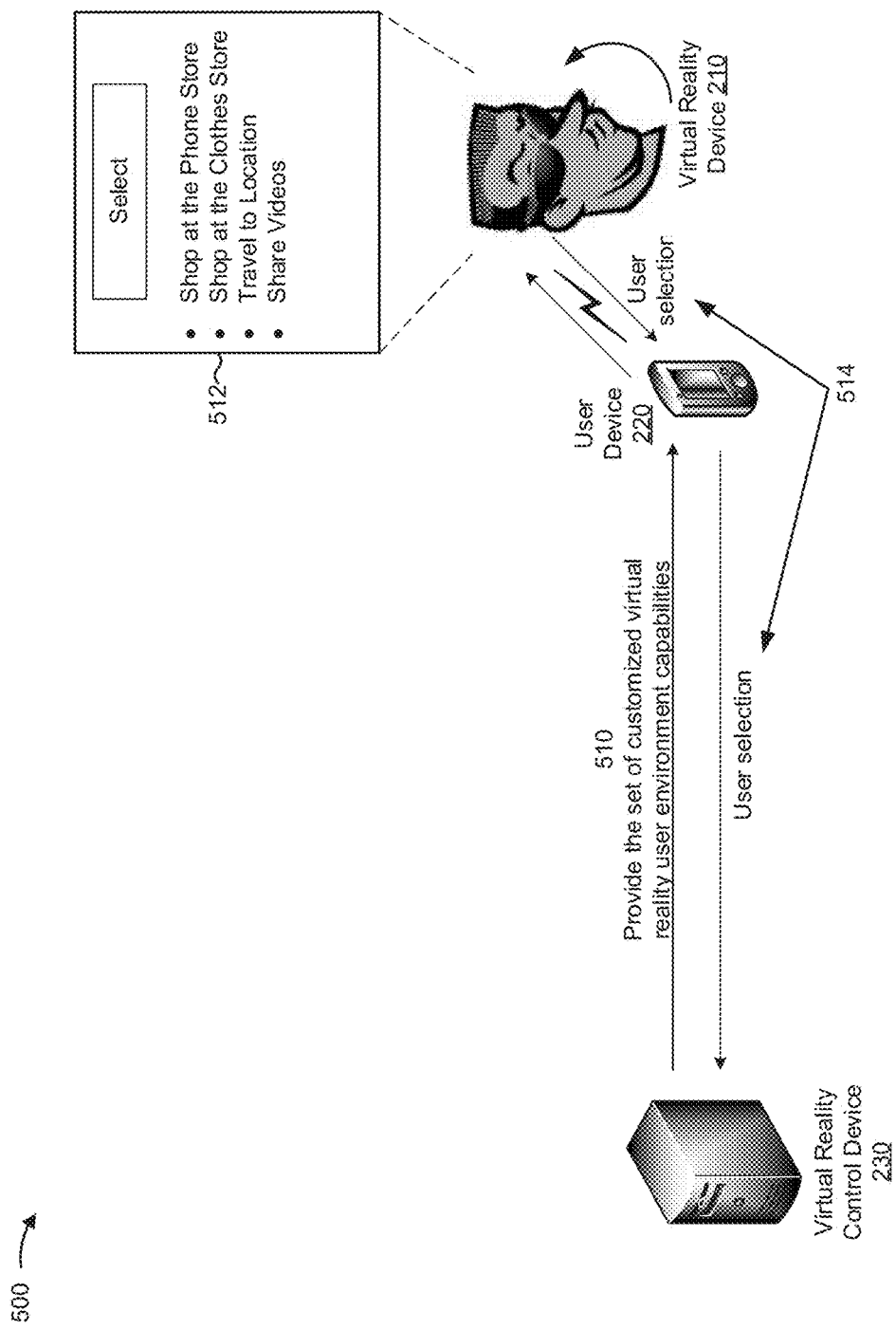

As shown in FIG. 5B, and by reference number 510, virtual reality control device 230 provides, for user selection, the particular set of customized virtual reality user environment options. As shown by reference number 512, the user may view a user interface showing the particular set of customized virtual reality user environment options (e.g., "Shop at the Phone Store," "Shop at the Clothes Store," "Travel to Location," and "Share Videos"). Assume the user selects the option to "Shop at the Phone Store." As shown by reference number 514, virtual reality control device 230 receives the user selection from virtual reality device 210 (e.g., via user device 220).

Figure 5C:
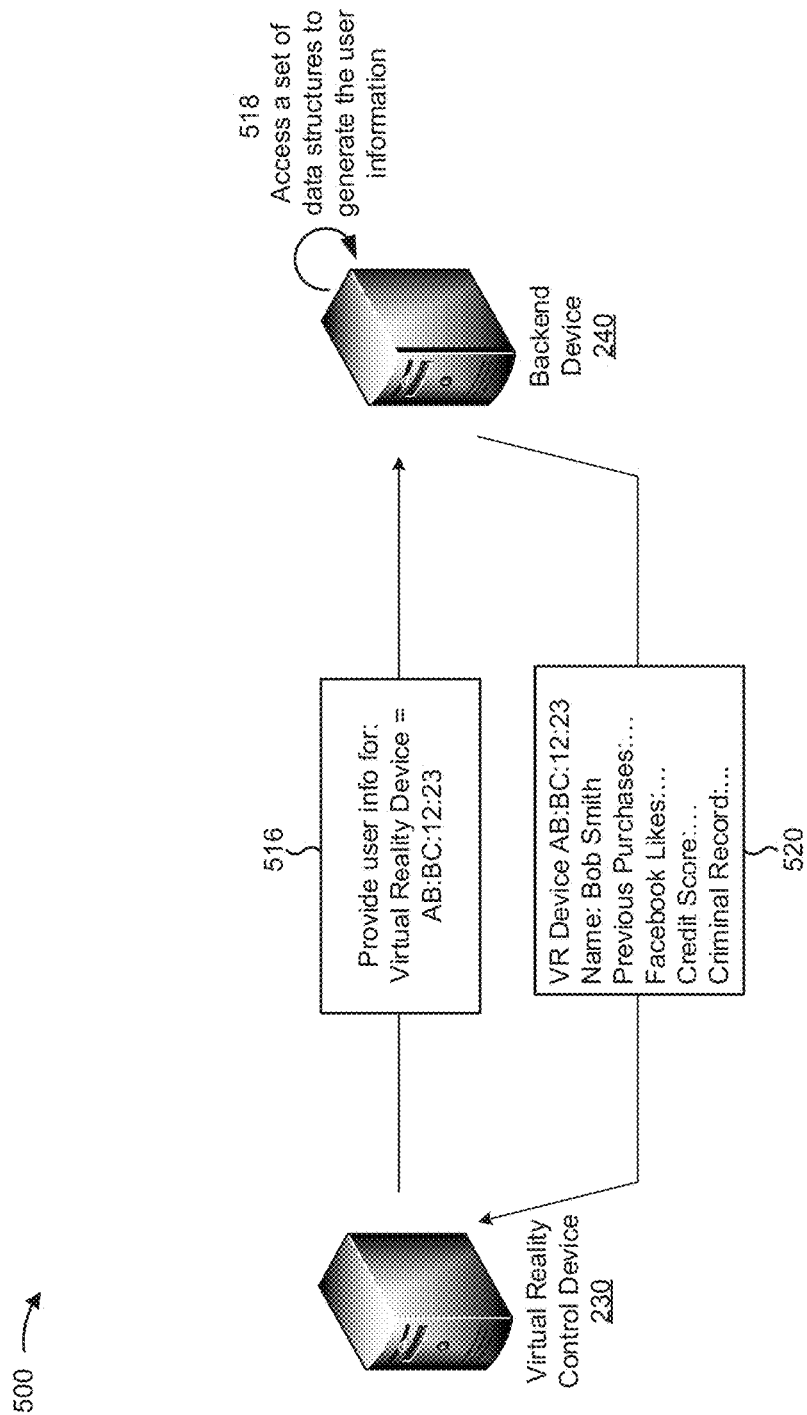

As shown in FIG. 5C, and by reference number 516, virtual reality control device 230 provides a request for user information to backend device 240 that includes the identification information for virtual reality device 210. As shown by reference number 518, backend device 240 accesses a set of data structures to generate user information for virtual reality control device 230. As shown by reference number 520, virtual reality control device 230 receives, from backend device 240, the user information identifying a user name (e.g., "Bob Smith"), a set of user previous purchases, a set of "Facebook Likes," a credit score for the user, and a criminal record for the user.

As shown in FIG. 5D, and by reference number 522, virtual reality control device 230 generates a particular customized virtual reality user environment (e.g., the "Phone Store") based on the user information. As shown by reference number 524, virtual reality control device 230 provides access to the customized virtual reality user environment. Assume that virtual reality control device 230 determined, based on the user information that the user had previously purchased a particular xPhone. As shown by reference number 526, the user may view the customized virtual reality user environment, and virtual reality control device 230 may include an offer for a new xPhone based on determining that the user purchased the particular xPhone a particular quantity of years ago. In this way, an operator of the store environment may provide a user experience targeted to the particular user.

Figure 5E:
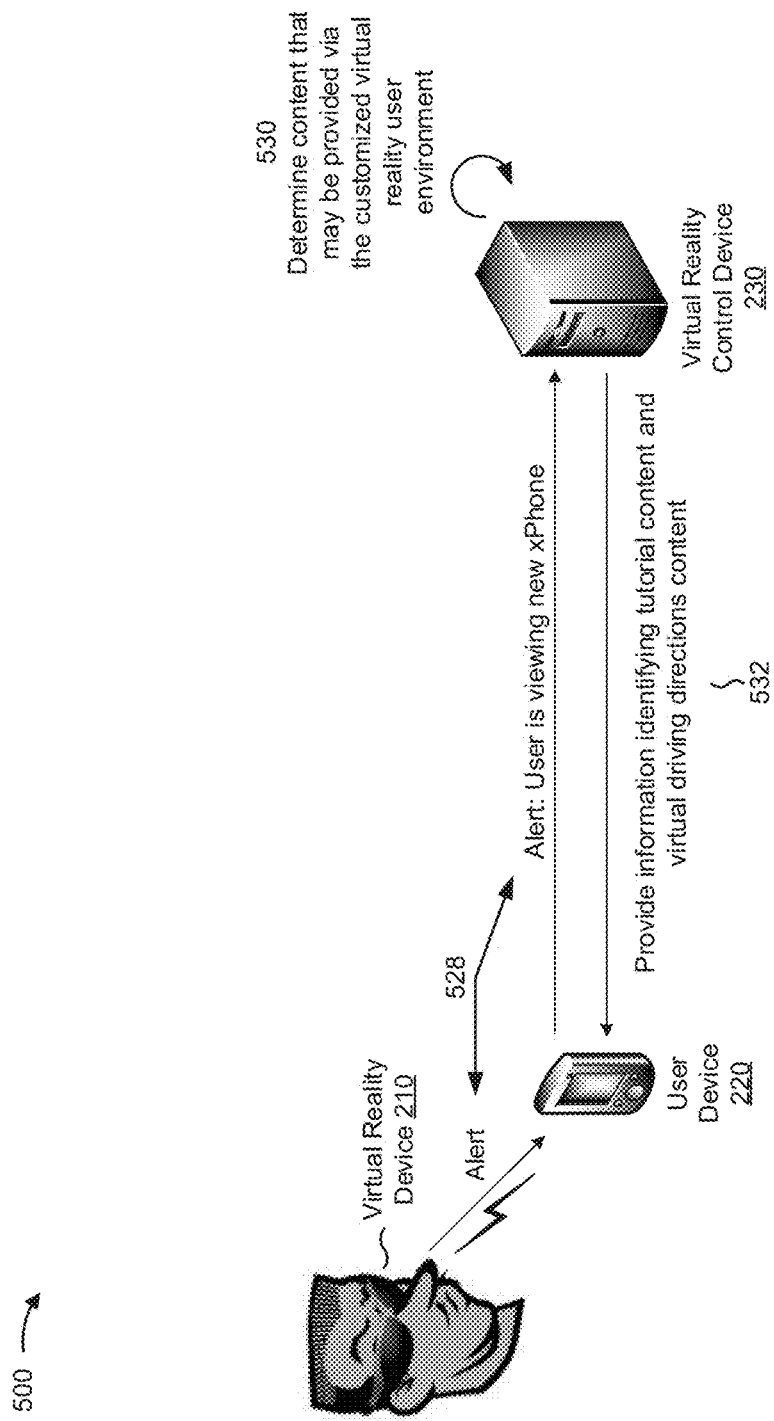

As shown in FIG. 5E, and by reference number 528, virtual reality device 210 provides (e.g., via user device 220) an alert indicating that the user is viewing the new xPhone that was offered by virtual reality control device 230 via the particular customized virtual reality user environment. As shown by reference number 530, virtual reality control device 230 may intelligently update the customized virtual reality user environments based on receiving the alert. Assume that the user information indicates that the user prefers to learn about operation of a product prior to purchase and that the user is located within a certain proximity of a brick-and-mortar store selling new xPhones. As shown by reference number 532, virtual reality control device 230 provides information identifying other content that may be provided, such as tutorial content (e.g., that may be utilized to learn about the new xPhone) and virtual driving directions content (e.g., for visiting the brick-and-mortar store). In this way, a virtual reality control device may intelligently update a customized virtual reality user environment to provide a user experience targeted toward an identified user based on the user's interaction with particular aspects of the customized virtual reality user environment.

Figure 5F:
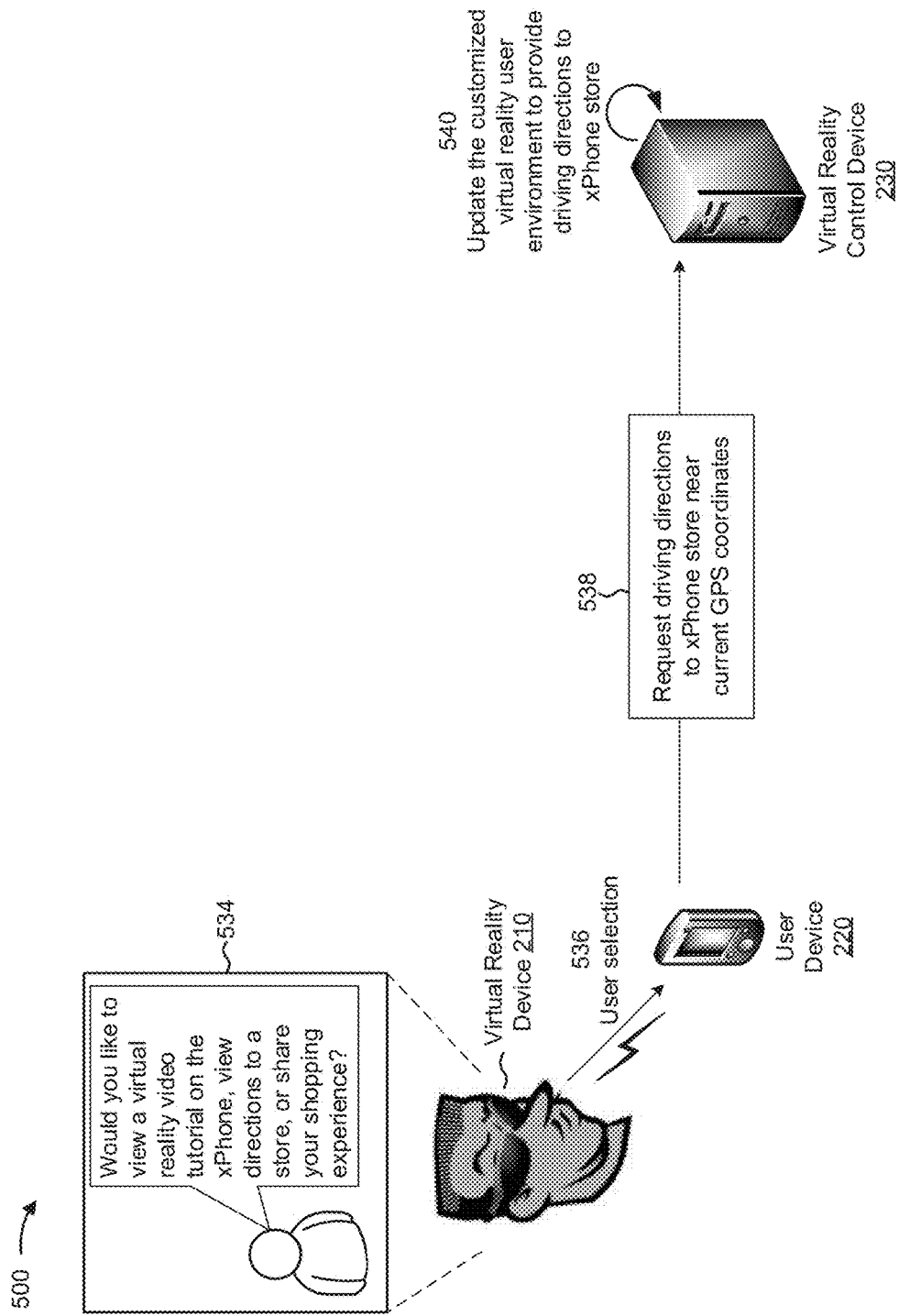

As shown in FIG. 5F, and by reference number 534, based on receiving the information identifying the other content that may be provided, virtual reality device 210 provides an option for a user selection to "view a virtual reality video tutorial," "view directions to a store," or "share" a video of the user's shopping experience (e.g., for employee training, for viewing by another user, etc.). Assume that the user selects to "view directions to a store," as shown by reference number 536, virtual reality device 210 provides an indication of the user selection to user device 220. As shown by reference number 538, user device 220 provides a request indicating the user selection to "view directions to a store" to virtual reality control device 230. As shown by reference number 540, virtual reality control device 230 updates the particular customized virtual reality user environment for providing driving directions based on receiving the indication of the user selection.

Figure 5G:
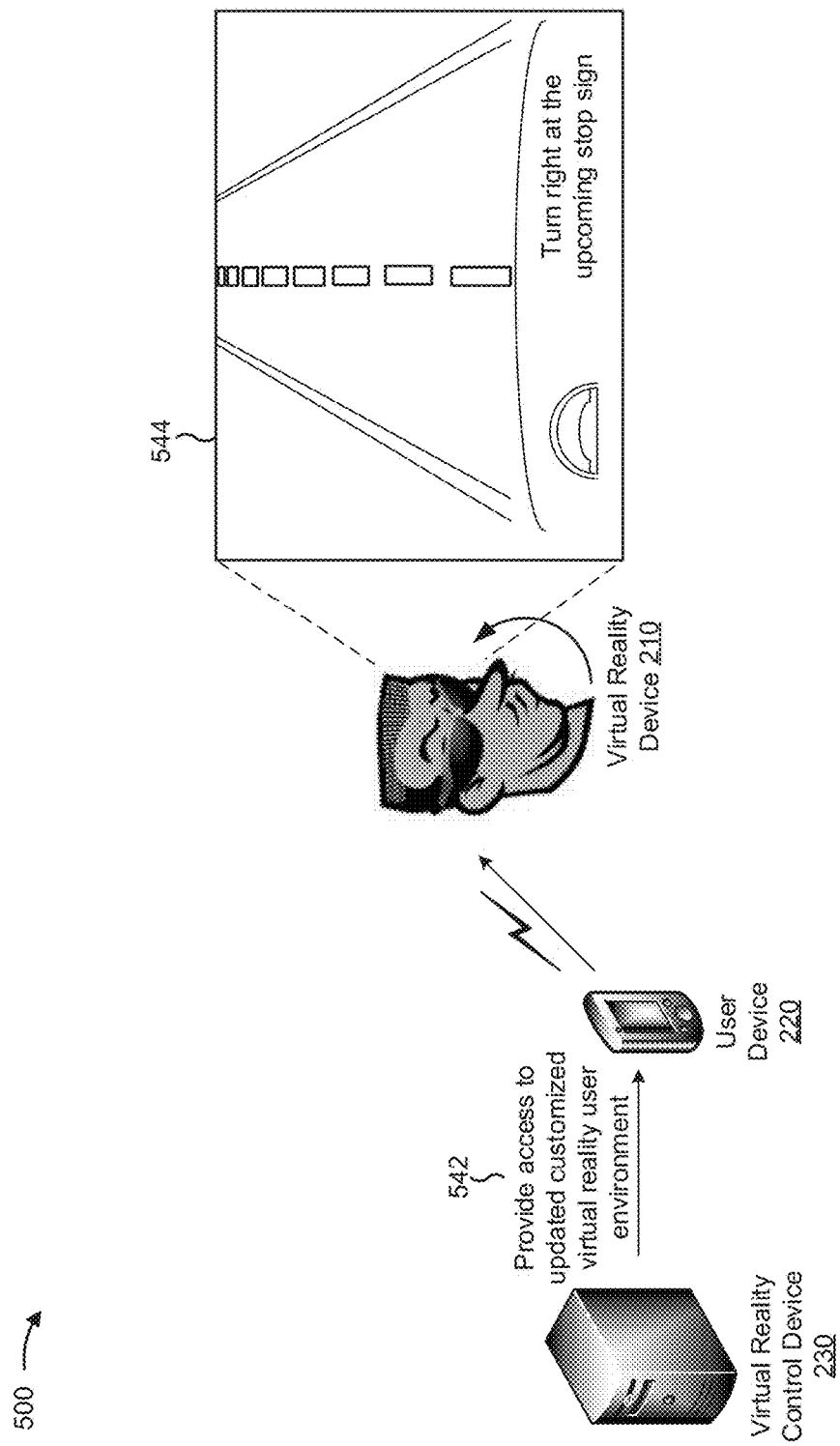

As shown in FIG. 5G, and by reference number 542, virtual reality control device 230 provides access to the updated customized virtual reality user environment. As shown by reference number 544, the user may view, via virtual reality device 210, a virtual representation of the driving directions to the brick-and-mortar store. The virtual representation of the driving directions may include an indication of one or more points of interest, an indication of one or more landmarks, or the like, associated with a route to the brick-and-mortar store. In this way, the user may familiarize him or herself with the route prior to driving the route.

As shown in FIG. 5H, assume that the user has selected to view a pre-recorded video shared by another user. As shown by reference number 546, virtual reality control device 230 selects the pre-recorded video associated with the other user (e.g., a tutorial video). Virtual reality control device 230 updates the customized virtual reality user environment, and as shown by reference number 548, provides access to the updated customized virtual reality user environment. As shown by reference number 550, the user may view the pre-recorded video (e.g., a tutorial video in which a sales person shows the other user "how to use the new xPhone") via the customized virtual reality user environment. In this way, a first user can share a video (e.g., of a store experience, of an event, of a current view, etc.) with a second user via the customized virtual reality user environment. In a similar manner, the first user could share an image, text, an audio file, or the like.

As indicated above, FIGS. 5A-5H are provided merely as examples. Other examples are possible and may differ from what was described with regard to FIGS. 5A-5H.

Figure 6A:
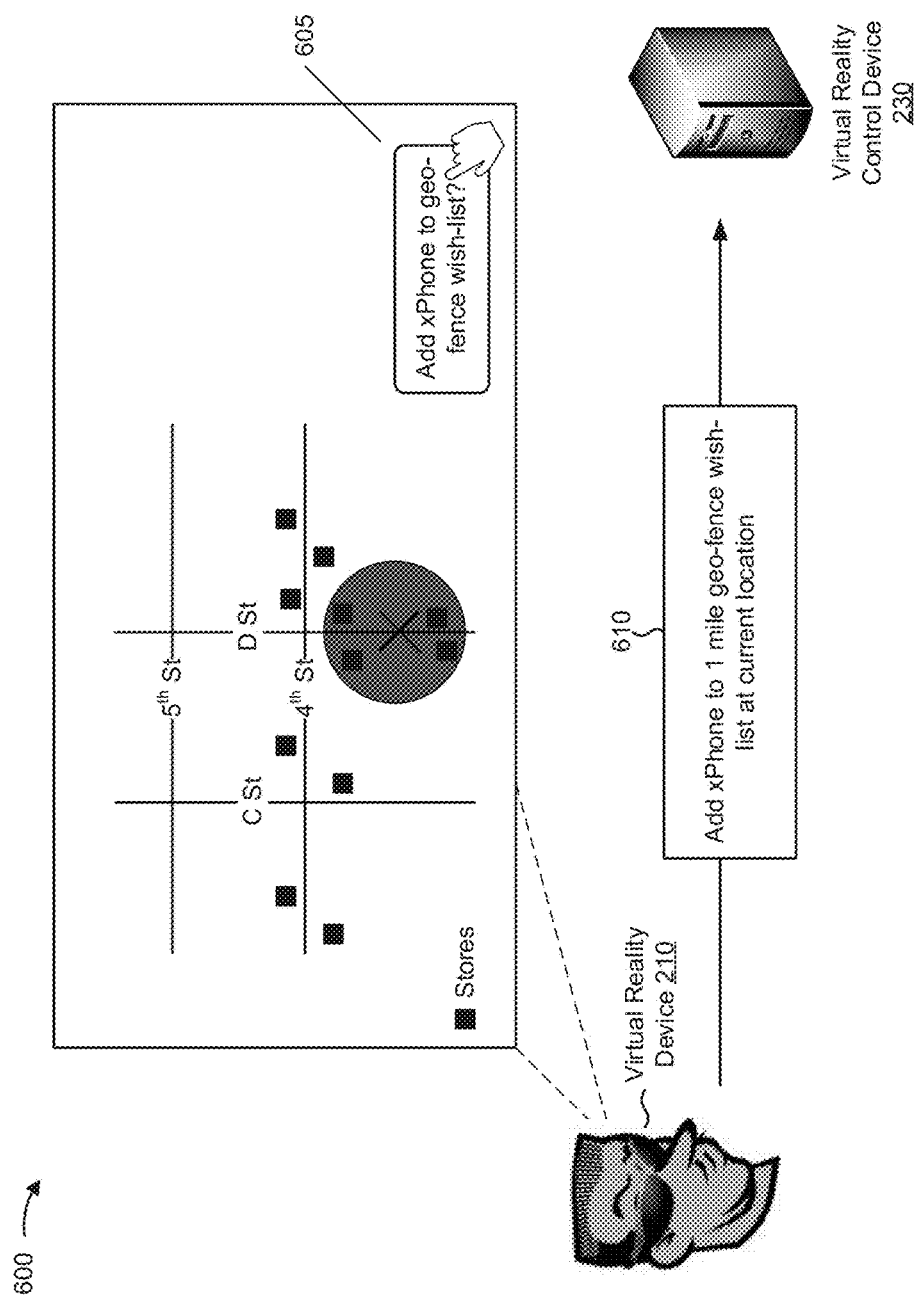
FIGS. 6A-6C are diagrams of another example implementation relating to the example process shown in FIG. 4.
Figure 6B:
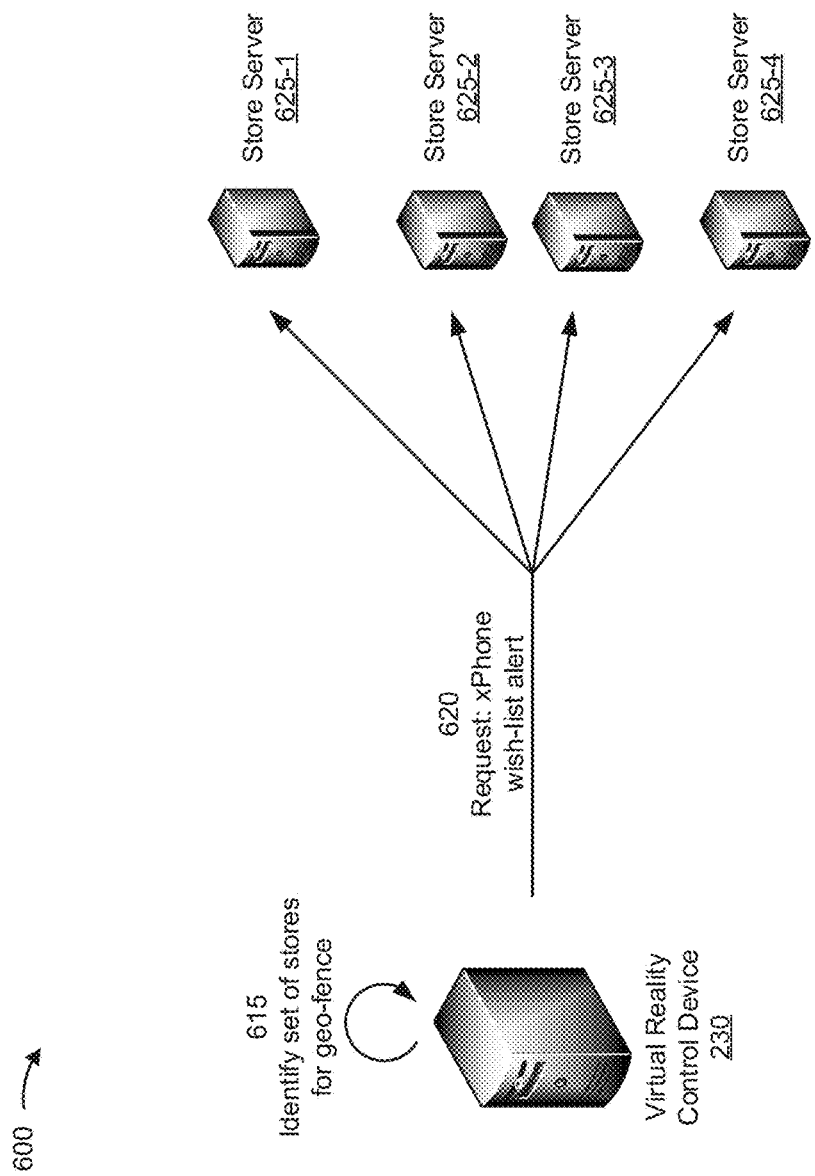
Figure 6C:
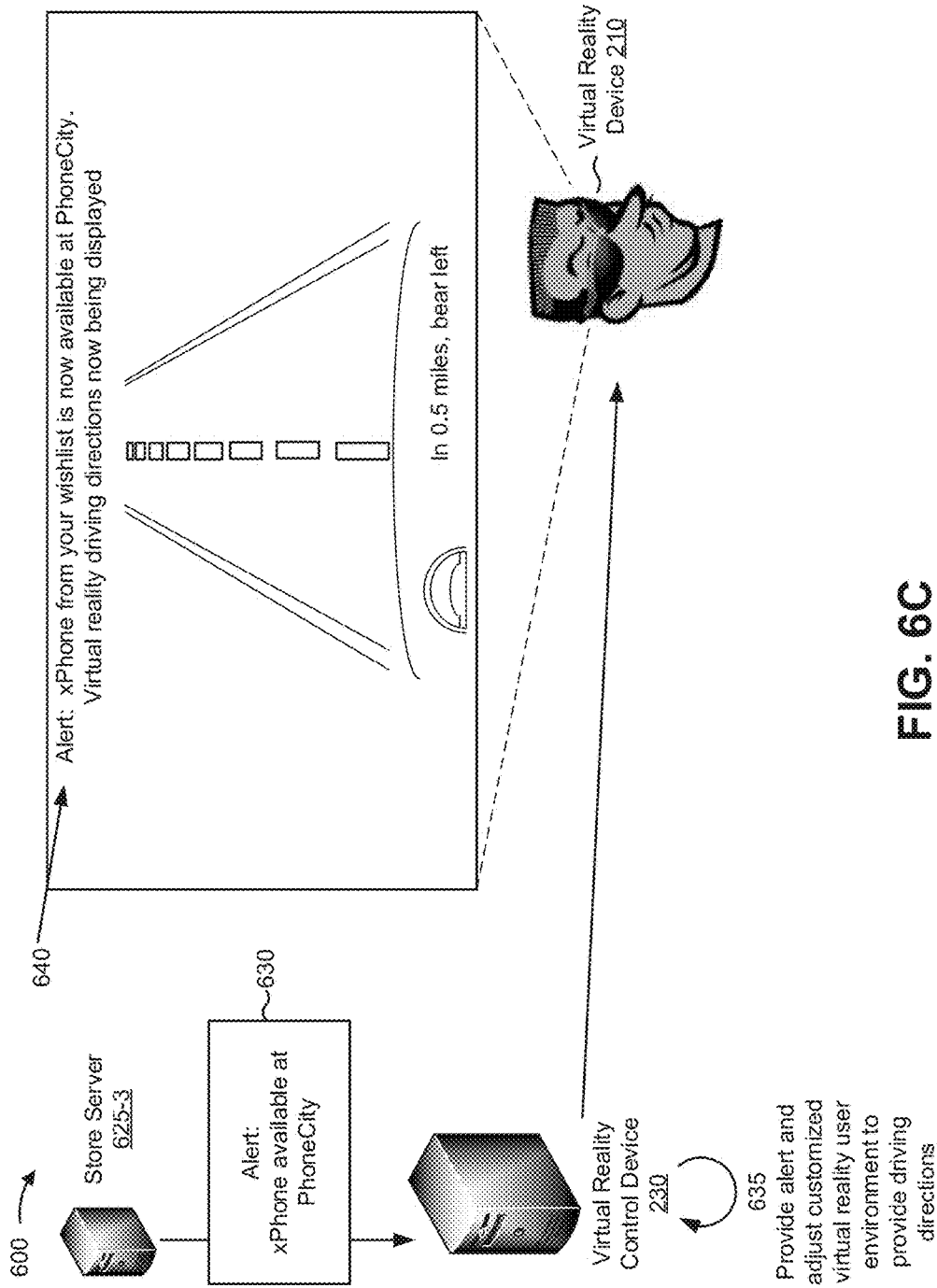

FIGS. 6A-6C are diagrams of an example implementation 600 relating to example process 400 shown in FIG. 4. FIGS. 6A-6C show an example of providing a customized virtual reality user environment.

As shown in FIG. 6A, and by reference number 605, a user establishes a geo-fence encompassing multiple stores (e.g., set-up to encompass electronic stores) around the user's current geographic location (e.g., within a particular proximity to the user's current location) for receiving an alert when a wish-list item (e.g., an xPhone) becomes available from one of the multiple stores. As shown by reference number 610, virtual reality device 210 provides an indication of the geo-fence to virtual reality control device 230.

As shown in FIG. 6B, and by reference number 615, virtual reality control device 230 identifies a set of stores for the geo-fence. As shown by reference number 620, virtual reality control device 230 provides, to a set of store servers 625 (e.g., store server 625-1, store server 625-2, store server 625-3, and store server 625-4 that provide information regarding available products at physical stores associated therewith) a request for an alert when the wish-list item becomes available.

As shown in FIG. 6C, and by reference number 630, store server 625-3 provides an alert to virtual reality control device 230 that the wish-list item, xPhone, has become available at a store associated with store server 625-3 (e.g., "PhoneCity"). As shown by reference number 635, virtual reality control device 230 provides an alert to virtual reality device 210 that the wish-list item is available and adjusts the customized virtual reality user environment to provide driving directions to the user. As shown by reference number 640, the alert regarding the wish-list item is overlaid on the customized virtual reality user environment and virtual driving directions are provided to the user. In this way, a user may select products to be purchased and may automatically receive alerts via the customized virtual reality user environment when the products become available, and may receive content, such as virtual driving directions, product tutorials, or the like, based on the products becoming available.

As indicated above, FIGS. 6A-6C are provided merely as examples. Other examples are possible and may differ from what was described with regard to FIGS. 6A-6C.

Figure 7A:
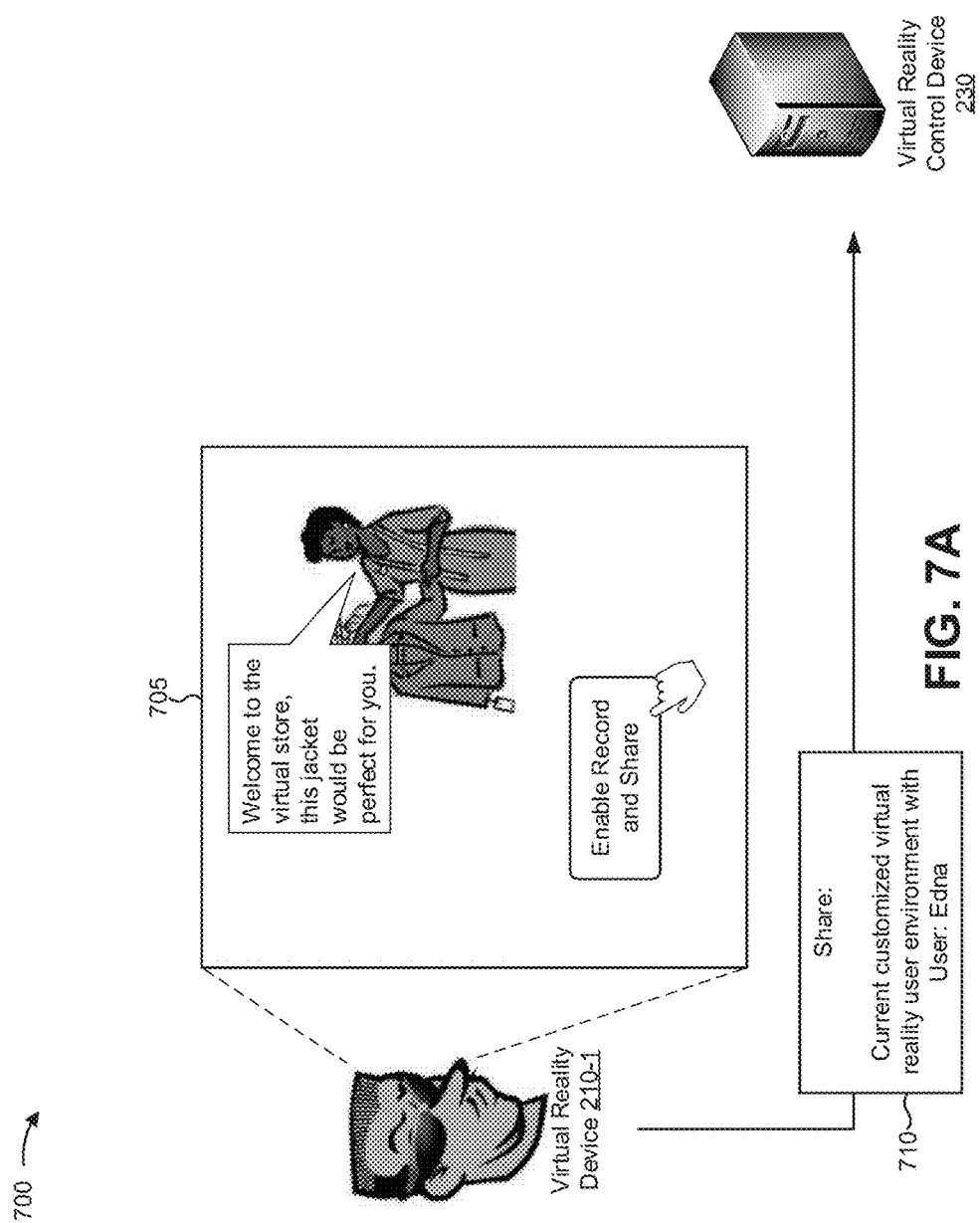
FIGS. 7A and 7B are diagrams of yet another example implementation relating to the example process shown in FIG. 4.
Figure 7B:
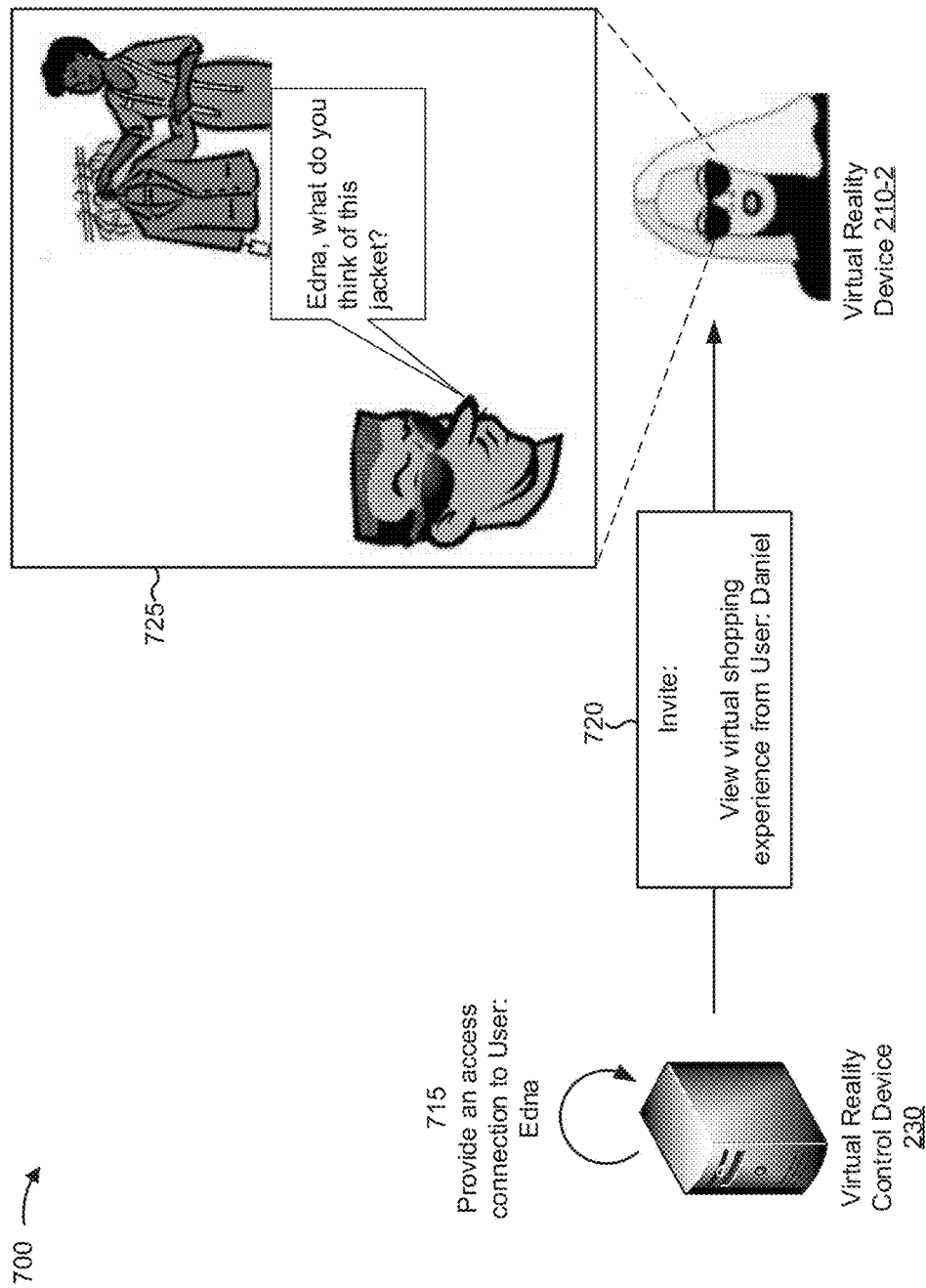

FIGS. 7A and 7B are diagrams of an example implementation 700 relating to example process 400 shown in FIG. 4. FIGS. 7A and 7B show an example of providing a customized virtual reality user environment.

As shown in FIG. 7A, and by reference number 705, a first user may indicate that the first user wants to share a customized virtual reality user environment configured for a clothing store experience with a second user. As shown by reference number 710, virtual reality device 210-1 provides a request, that the customized virtual reality user environment be shared with the second user, to virtual reality control device 230.

As shown in FIG. 7B, and by reference number 715, virtual reality control device 230 provides an access connection to the second user so that the customized virtual reality user environment is shared and adjusts the customized virtual reality user environment to provide communication between the first user and the second user. As shown by reference number 720, virtual reality control device 230 invites virtual reality device 210-2 to join the "virtual shopping experience" from the first user (e.g., "Daniel"). As shown by reference number 725, the second user (e.g., "Edna") joins the customized virtual reality user environment and is provided with communication functionality with the first user. In this way, two users may shop via a customized virtual reality user environment in a similar manner to a physical store.

As indicated above, FIGS. 7A and 7B are provided merely as examples. Other examples are possible and may differ from what was described with regard to FIGS. 7A and 7B.

In this way, a virtual reality control device may customize a virtual reality user environment based on user information to provide an enhanced virtual experience to the user. For example, when the user utilizes the customized virtual reality user environment to virtually visit a store, the store may provide a user experience customized and intelligently updated based on determined preferences, identity, location, or the like of the user.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memory devices to store instructions; and
   one or more processors to execute the instructions to:
      receive identification information associated with a user of a virtual reality device,
         the virtual reality device being associated with a heads-up display eye tracking capability;
      provide, to a backend device, the identification information associated with the user of the virtual reality device;
      determine user information based on the identification information associated with the user,
         the user information being determined based upon receiving the user information from the backend device,
         the user information being stored via a data structure associated with the backend device;
      select a particular virtual reality user environment for providing content,
         the particular virtual reality user environment being selected based upon one or more capabilities of the virtual reality device,
         the particular virtual reality user environment being associated with a virtual store,
         the particular virtual reality user environment including an interactive component;
      generate a customized virtual reality user environment based on the particular virtual reality user environment and the user information,
         the customized virtual reality user environment including access to content selected based on the user information;
      provide access to the customized virtual reality user environment for display,
         the access being delayed until a notification trigger is received,
            the notification trigger being received with at least one of:
               an indication that an event associated with the customized virtual reality user environment has started, or
               an indication that a product associated with the customized virtual reality user environment has become available based on a user-established geo-fence;
      determine that the notification trigger has been received;
      make particular content associated with the notification trigger available via the customized virtual reality user environment;
      provide an alert that the particular content is available;
      monitor user interaction within the virtual store from within the customized virtual reality user environment; and
      selectively update the customized virtual reality user environment based on the user interaction and particular information regarding the user.

2. The device of claim 1, where the one or more processors are further to:
   detect a user interaction within the customized virtual reality user environment;
   select other content for the user based on the user interaction and the user information; and
   provide access to the other content via the customized virtual reality user environment.

3. The device of claim 1, where the one or more processors are further to:
   determine a geographic location associated with the user; and
   where the one or more processors, when generating the customized virtual reality user environment, are further to:
      generate the customized virtual reality user environment based on the geographic location associated with the user.

4. The device of claim 1, where the one or more processors are further to:
   determine a set of map directions associated with directing the user to a physical store location associated with the virtual store; and
   where the one or more processors, when generating the customized virtual reality user environment, are further to:
      provide access to particular content via the customized virtual reality user environment,
         the particular content including virtual map directions,
            the virtual map directions being associated with the set of map directions.

5. The device of claim 1, where the one or more processors are further to:
   determine that the user is viewing an object within the customized virtual reality user environment;
   access a set of videos associated with the object; and
   where the one or more processors, when providing access to the customized virtual reality user environment, are further to:
      provide access to the set of videos associated with the object via the customized virtual reality user environment.

6. The device of claim 1, where the one or more processors are further to:
   determine, based on the user information, that the user is an employee of the virtual store;
   identify a set of training videos associated with employment at the virtual store; and
   where the one or more processors, when providing access to the customized virtual reality user environment, are further to:
      provide access to the set of training videos via the customized virtual reality user environment.

7. The device of claim 1, where the one or more processors are further to:

access one or more data structures storing information about a set of particular users,
the user being included in the set of particular users; and
where the one or more processors, when determining the user information, are further to:
select user information, regarding the user, that is included in the one or more data structures.

8. A non-transitory computer-readable medium storing instructions, the instructions comprising:
one or more instructions that, when executed by one or more processors, cause the one or more processors to:
receive identification information associated with a virtual reality device,
the virtual reality device including:
a user interaction component, and
a heads-up display eye tracking capability;
provide, to a backend device, the identification information associated with a user of the virtual reality device;
receive, from the backend device, user information from one or more data structures to determine one or more preferences associated with the user of the virtual reality device;
select a particular virtual reality user environment for providing content,
the particular virtual reality user environment being selected based upon one or more capabilities of the virtual reality device;
generate a customized virtual reality user environment based on the one or more preferences associated with the user,
the customized virtual reality user environment being associated with a virtual store;
provide access to the customized virtual reality user environment to the user via the virtual reality device,
the access being delayed until a notification trigger is received,
the notification trigger being received with at least one of:
an indication that an event associated with the customized virtual reality user environment has started, or
an indication that a product associated with the customized virtual reality user environment has become available based on a user-established geo-fence;
determine that the notification trigger has been received;
make particular content associated with the notification trigger available via the customized virtual reality user environment;
provide an alert that the particular content is available;
generate a recording of one or more user interactions, within the virtual store, being performed by the user via the virtual reality device; and
store the recording of the one or more user interactions.

9. The non-transitory computer-readable medium of claim 8, where the one or more instructions, when executed by the one or more processors, further cause the one or more processors to:
receive a request to share the recording of the one or more user interactions,
the request including information identifying a particular user;
access the recording; and
provide the recording to the particular user.

10. The non-transitory computer-readable medium of claim 8, where the one or more instructions, when executed by the one or more processors, further cause the one or more processors to:
determine one or more attributes associated with the virtual reality device; and
where the one or more instructions, that cause the one or more processors to generate the customized virtual reality user environment, further cause the one or more processors to:
generate the customized virtual reality user environment based on the one or more attributes associated with the virtual reality device.

11. The non-transitory computer-readable medium of claim 8, where the one or more instructions, when executed by the one or more processors, further cause the one or more processors to:
determine that the user is viewing a product demonstration via the customized virtual reality user environment,
the recording corresponding to the product demonstration; and
where the one or more instructions further cause the one or more processors to:
share the recording with one or more other users requesting the product demonstration.

12. The non-transitory computer-readable medium of claim 8, where the one or more instructions, when executed by the one or more processors, further cause the one or more processors to:
receive, from the user, information identifying another user,
the other user utilizing another virtual reality device;
determine another one or more preferences associated with the other user;
provide access to the customized virtual reality user environment to the other user; and
update the customized virtual reality user environment based on the one or more preferences associated with the user and the other one or more preferences associated with the other user.

13. The non-transitory computer-readable medium of claim 8, where the one or more instructions, when executed by the one or more processors, further cause the one or more processors to:
determine that the user is attempting to perform a transaction via the customized virtual reality user environment;
determine that the one or more data structures storing user information includes payment information associated with the user; and
process the transaction using the payment information associated with the user.

14. The non-transitory computer-readable medium of claim 8, where the one or more instructions, when executed by the one or more processors, further cause the one or more processors to:
authenticate the virtual reality device based on receiving the identification information associated with the virtual reality device.

15. A method, comprising:
receiving, by a device, identification information associated with a virtual reality device,
the identification information identifying a user of the virtual reality device, and
the virtual reality device being associated with a heads-up display eye tracking capability;

providing, by the device and to a backend device, the identification information associated with the user of the virtual reality device;

determining, by the device, particular information regarding the user of the virtual reality device based on the identification information, the particular information regarding the user being determined based upon receiving the particular information regarding the user from the backend device, the particular information regarding the user being stored via a data structure associated with the backend device;

determining, by the device, one or more virtual reality user environments that may be provided via the virtual reality device based upon one or more capabilities of the virtual reality device, the one or more virtual reality user environments corresponding to one or more virtual stores and/or one or more videos associated with the one or more virtual stores;

generating, by the device, a customized virtual reality user environment based on the particular information regarding the user and the one or more virtual reality user environments that may be provided via the virtual reality device;

providing, by the device, access to the customized virtual reality user environment, the access being delayed until a notification trigger is received, the notification trigger being received with at least one of:

an indication that an event associated with the customized virtual reality user environment has started, or an indication that a product associated with the customized virtual reality user environment has become available based on a user-established geo-fence;

determining, by the device, that the notification trigger has been received;

making, by the device, particular content associated with the notification trigger available via the customized virtual reality user environment;

providing, by the device, an alert that the particular content is available;

monitoring, by the device, user interaction, within one of the one or more virtual stores, from within the customized virtual reality user environment; and selectively updating, by the device, the customized virtual reality user environment based on the user interaction and the particular information regarding the user.

16. The method of claim 15, where monitoring user interaction within the customized virtual reality user environment further comprises:

detecting a user interaction within the customized virtual reality user environment;

determining that the user interaction is associated with particular content to be provided via the customized virtual reality user environment; and where selectively updating the customized virtual reality user environment further comprises:

providing the particular content via the customized virtual reality user environment.

17. The method of claim 15, where providing access to the customized virtual reality user environment further comprises:

providing augmented reality information to the user via the customized virtual reality user environment.

18. The method of claim 15, where determining particular information regarding the user further comprises:

receiving information regarding the user from one or more data structures; and processing the information from the one or more data structures to identify a subset of the information from the one or more data structures that pertains to the user.

19. The method of claim 15, where determining particular information regarding the user further comprises:

querying the user to determine a set of user preferences.

20. The method of claim 15, further comprising:

receiving a request to share the customized virtual reality user environment with another user, the other user utilizing another virtual reality device; and providing, to the other virtual reality device, access to the customized virtual reality user environment.

* * * * *